United States Patent
Beri et al.

(10) Patent No.: US 11,410,357 B2
(45) Date of Patent: Aug. 9, 2022

(54) PIXEL-BASED TECHNIQUES FOR COMBINING VECTOR GRAPHICS SHAPES

(71) Applicant: Adobe Inc., San Jose, CA (US)

(72) Inventors: Tarun Beri, Uttar Pradesh (IN); Gaurav Jain, Uttar Pradesh (IN); Ankit Aggarwal, Haryana (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/938,133

(22) Filed: Jul. 24, 2020

(65) Prior Publication Data
US 2022/0028135 A1 Jan. 27, 2022

(51) Int. Cl.
*G09G 5/00* (2006.01)
*G06T 11/20* (2006.01)
*G06T 11/60* (2006.01)
*G06T 1/60* (2006.01)

(52) U.S. Cl.
CPC .............. *G06T 11/203* (2013.01); *G06T 1/60* (2013.01); *G06T 11/60* (2013.01)

(58) Field of Classification Search
CPC .... G09G 5/14; G09G 2340/125; G09G 5/395; G09G 2349/10; G09G 2340/12
USPC ......................................................... 345/634
See application file for complete search history.

(56) References Cited

U.S. PATENT DOCUMENTS

| | | | |
|---|---|---|---|
| 2004/0194020 A1* | 9/2004 | Beda | G06T 11/60 715/211 |
| 2007/0250705 A1* | 10/2007 | Smith | G06Q 30/0266 713/157 |
| 2013/0120381 A1* | 5/2013 | Lau | G09G 5/363 345/423 |

\* cited by examiner

*Primary Examiner* — Gordon G Liu
(74) *Attorney, Agent, or Firm* — NDWE LLP

(57) ABSTRACT

Embodiments are disclosed for pixel-based techniques for combining vector graphics shapes. In particular, in one or more embodiments, the disclosed systems and methods comprise receiving a selection of a plurality of vector graphics shapes to be combined based on an operation type, identifying a dominant shape based on the operation type, applying stroke and fill properties associated with the dominant shape to each of the plurality of vector graphics shapes, initializing a buffer at least as large as a bounding box associated with the plurality of vector graphics shapes, the buffer storing pixels inside the bounding box, and populating each pixel of the buffer with values representing pixel types determined from the plurality of vector graphics shapes based on the operation type.

21 Claims, 16 Drawing Sheets

PIXEL-BASED TECHNIQUES FOR COMBINING VECTOR GRAPHICS SHAPES

BACKGROUND

Conventional computer graphic systems enable users to create various types of computer graphics content such as free form illustration, engineering design, or other types of technical or non-technical computer graphics. Content design systems enable users to combine basic shapes to form more complex geometries. However, conventional techniques combine shapes by geometrically solving for shape intersections. The reliance on complex mathematical computations leads to poor performance when combining more than a few shapes at a time or when attempting to combine the results of one set of combined shapes with one or more additional shapes. As such, the user must wait while the calculations are performed, leading to noticeable lag and denying the user real-time feedback for these operations.

These and other problems exist with regard to rendering vector graphics in electronic systems.

SUMMARY

Introduced here are techniques/technologies that perform vector shape combination operations at the pixel level. For example, when combining two or more vector shapes, each pixel of the resulting combination is determined to be either a "fill" pixel or a "stroke" pixel based on the type of combination operation being performed. One of the shapes being combined is determined to be the "dominant" shape, and the characteristics (e.g., color, stroke width, etc.) of the fill and stroke pixels of the dominant shape are applied to the fill and stroke pixels of the resulting combination. Additionally, embodiments enable nesting of combination operations, where one set of shapes are combined, and the resulting combined shape is then combined with one or more additional shapes. This can be performed by reusing the fill/stroke information for each pixel from one combination operation to another. The disclosed techniques simplify the processing required to combine multiple vector shapes. This improves the performance of the combination operations, particularly when a large number of vector shapes are being combined, allowing for the combination operations to be performed in real-time.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Content design applications, including vector graphics tools, have enabled users to create new shapes from overlapping vector graphics shapes (e.g., shapes comprising one or more connected Bezier curves, lines, etc.). There are various operations that may be performed, such as a unite operation (where the overlapping shapes are merged into a single shape), an intersection operation (where only the intersection of the selected shapes is preserved), a minus-front operation (where the shapes are subtracted from the bottom-most shape), a minus-back operation (where the shapes are subtracted from the top-most shape), and an exclude overlap shape (where overlapping fills of shapes are canceled out). As discussed, conventional methods rely on performing mathematical calculations to identify intersections between the shapes and to create the combined shapes. This results in reduced performance of the operations which becomes worse as the number and/or complexity of the shapes being combined increases.

One or more embodiments of the present disclosure include techniques for performing shape combination operations at the pixel level. Rather than performing calculations to identify intersections of overlapping shapes, a value for each output pixel can be determined based on the type of operation being performed. For example, depending on the operation being performed, a dominant shape can be identified. The stroke characteristics and fill color of the dominant shape can be applied to all the other shapes. Each pixel of the output shape is a stroke pixel or a fill pixel. The type of pixel depends on how the input shapes overlap and the type of operation being performed to combine the input shapes. Once each output pixel type has been determined, then the fill color can be applied to the fill pixels and the stroke characteristics (e.g., color, width, etc.) can be applied to the stroke pixels. As discussed further below, these techniques enable vector shapes to be combined in real-time and remain performant as the number of shapes being combined increases. This allows for real-time feedback to be provided to the user as combination operations are performed even on complex operations involving many vector shapes.

Figure 1:
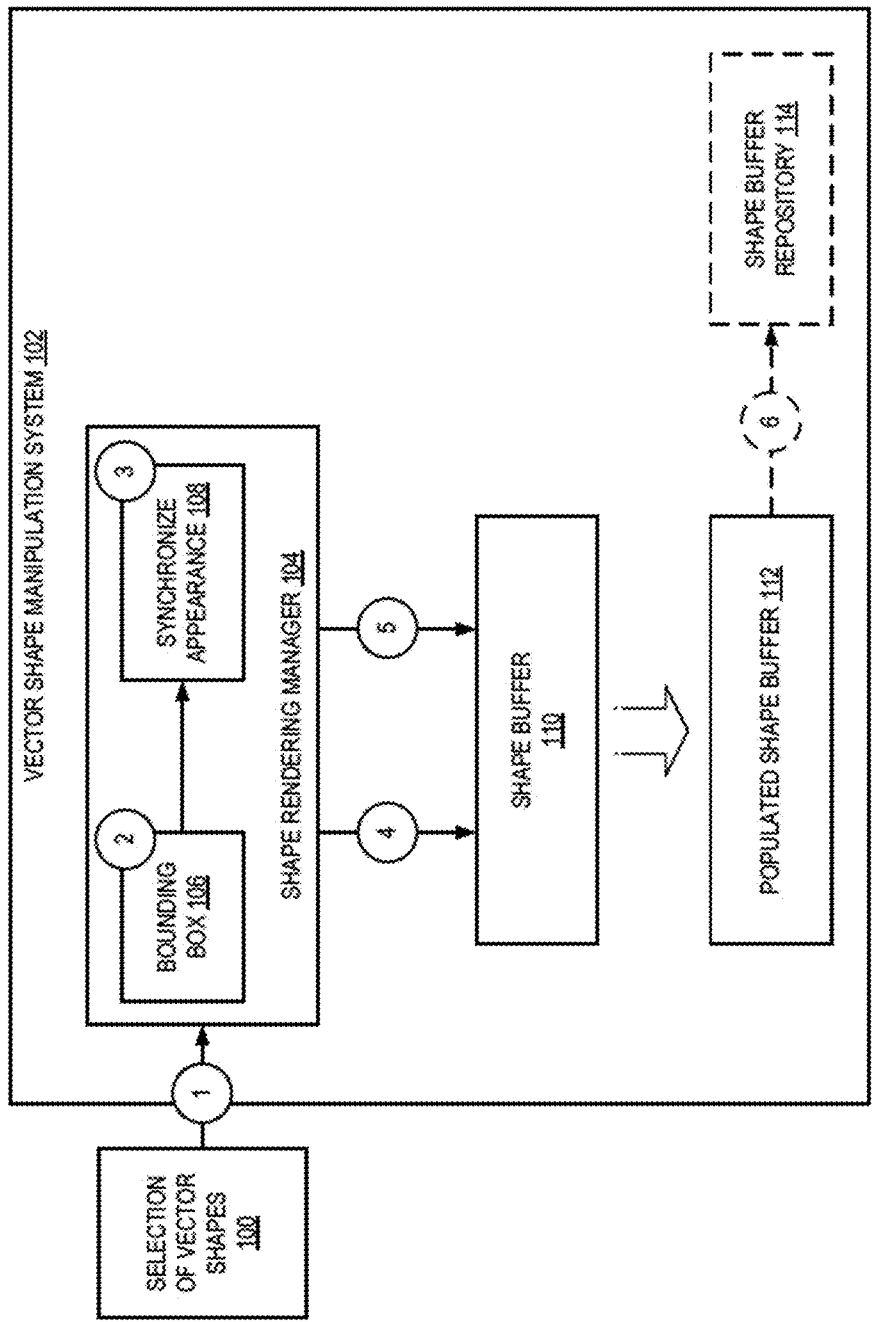
FIG. 1 illustrates a diagram of a process of combining vector graphics shapes in accordance with one or more embodiments.

FIG. 1 illustrates a diagram of a process of combining vector graphics shapes in accordance with one or more embodiments. As discussed, embodiments enable multiple 2D vector shapes (e.g., Bezier shapes) to be combined in real time. A user can select a plurality of vector shapes in a content design application. For example, the user can interact with the content design application through a graphical user interface (GUI), and select multiple shapes by clicking the shapes, tapping the shapes, or otherwise interacting with the GUI via one or more user input devices, to select multiple vector graphics shapes. As shown in FIG. 1, this selection of vector shapes 100 can be received by a vector shape manipulation system 102, at numeral 1. For example, once the vector shapes have been selected, the user can select a particular combination operation (e.g., unite, intersect, minus front, minus back, exclude overlap, etc.) to be performed on the selected shapes. This may include, e.g., interacting with a user interface element, such as a button, menu, etc., to select the combination operation to be performed on the selected elements.

In some embodiments, as a pre-processing step, the shape rendering manager 104 can close any selected shapes that are open by joining the shape's endpoints with a straight line. Once the vector shapes and the combination operation have been selected, a shape rendering manager 104 can identify a bounding box 106 around the selected shapes at numeral 2. The bounding box is at least large enough to include all of the selected shapes. Although a bounding box is described, other bounding shapes may similarly be used. Once a bounding box has been identified, the shape rendering manager 104 can synchronize the appearance 108 of the selected shapes, at numeral 3. The appearance of the shapes (e.g., the stroke characteristics and fill color) can be synchronized based on various factors. For example, in some embodiments, a combination operation may define a dominant shape whose appearance is applied to all other shapes. Additionally, or alternatively, the user may select a dominant shape. For example, the user can customize the combination operation to specify which shape is the dominant shape, the user can specify the dominant shape while selecting the vector shapes, or the dominant shape can be determined from the order in which the user selects the vector shape (e.g., the first shape can be the dominant shape or the last shape can be the dominant shape, etc.).

At numeral 4, the shape rendering manager 104 can allocate a shape buffer 110 that is the same size as, or larger than, the bounding box. The techniques described herein may be implemented using various processing devices, such as central processing units (CPUs), graphics processing units (GPUs), etc. Depending on implementation, the shape rendering manager can allocate a region of memory that is at least as large as the bounding box, this region may be referred to as a buffer (e.g., when implemented using a CPU) or a texture (e.g., when implemented using a GPU). In the embodiments described herein, this region of memory may be referred to as a buffer or a texture. The shape buffer 110 (or texture, as discussed) may store output pixel values for the pixels included in the bounding box.

When the shape buffer 110 is allocated, it can be initialized with all zero values and then populated with output values indicating whether a given pixel is a stroke pixel or a fill pixel, at numeral 5. For every pixel in the bounding box, the shape rendering manager 104 can determine an output value based on the selected vector shapes 100 and the selected combination operation. The output value may be a sentinel value that represents whether a given output pixel is a stroke pixel, a fill pixel, or a pixel that is not covered by the combined shape. For example, a pixel can be determined to have a value of 0 if it is not covered by the combined shape, a pixel can have a value of 1 if it is a stroke pixel, and a pixel can have a value of 2 if it is a fill pixel. Although specific sentinel values are referred to herein, embodiments may be implemented using any values to represent the type of output pixel based on the combination operation. The output pixels may be processed in parallel as all output pixels of a given input shape can be processed simultaneously or concurrently, while each shape may be processed sequentially. Thus, embodiments produce much faster results by employing multiple CPU threads and/or GPU threads to process the output pixels in parallel.

The way shapes are processed to populate the shape buffer 110 varies depending on the combination operation that has been selected. For example, a unite operation dissolves shapes at stroke boundaries (e.g., stroke pixels of one shape are overwritten by fill pixels of other shapes), while intersect produces a common area that all the input shapes overlap. Minus front starts with the area of the bottom-most shape and subtracts the area occupied by other shapes, while minus back starts with the area of top-most shape and subtracts the area occupied by others. Further, exclude overlap cancels out any fill of one shape overlapping the fill of another shape, resulting in even number of overlapping fills being removed and odd numbers of overlapping fills remaining.

After the shape buffer has been populated with fill and stroke pixel data, resulting in populated shape buffer 112, the appearance of the dominant shape can be applied to the pixels in the shape buffer. As discussed, in some embodiments, the dominant shape is determined based on the combination operation selected. For example, the top-most shape in z-order may be the dominant shape for Unite, Intersect, Minus Back, and Exclude Overlap operations, while the bottom-most shape in z-order may be the dominant shape for Minus Front operations. Pixels marked for fill have the fill color of the dominant shape applied to them and the pixels marked for stroke have the stroke characteristics (e.g., color, width, etc.) of the dominant shape applied to them.

In some embodiments, the contents of the populated shape buffer 112 can be stored to a shape buffer repository 114, at numeral 6. The shape buffer repository may be a separate memory or disk location to store the results of previous combination operations. This enables a shape that has been created via a combination operation to be further combined with one or more additional shapes in a nested combination operation. Alternatively, the populated shape buffer 112 can be maintained in memory and any unrelated combination operations can be performed using a newly allocated shape buffer.

Figure 2:
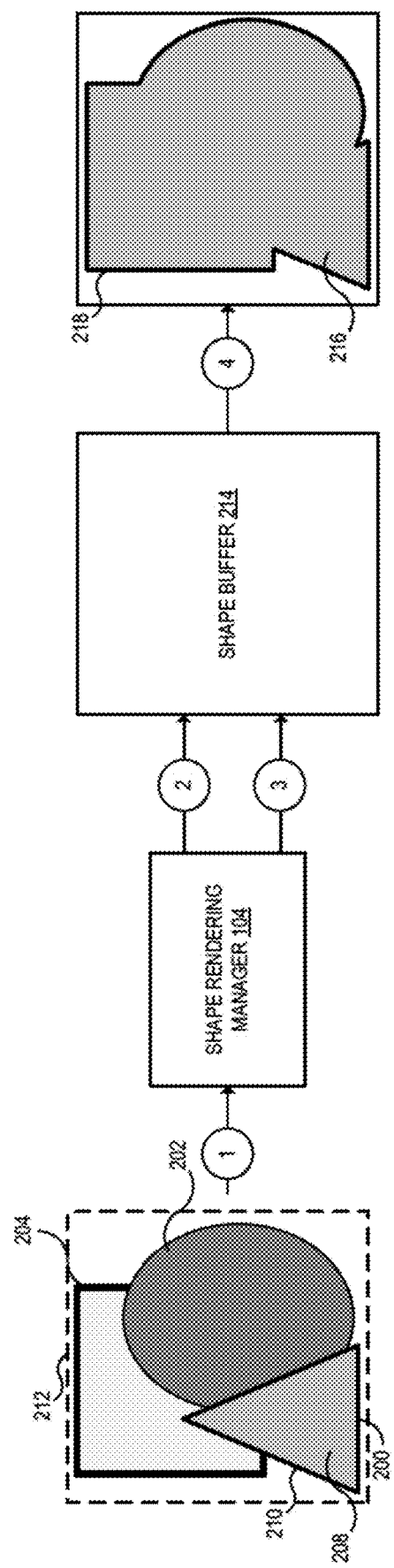
FIG. 2 illustrates a diagram of a process of performing a unite operation in accordance with one or more embodiments.

FIG. 2 illustrates a diagram of a process of performing a unite operation in accordance with one or more embodiments. As shown in FIG. 2, multiple overlapping shapes can be combined in a unite operation which merges the three shapes. For example, a triangle 200, an oval 202 and a square 204 are shown overlapping. Each shape has different fill color and stroke characteristics. For example, triangle 200, has a medium gray fill 208 and a medium width stroke 210, oval 202 has a dark grey fill and a light width stroke, and square 204 has a light grey fill and a heavy width stroke. Because this is a unite operation, the dominant shape, unless otherwise specified by a user, is the topmost shape, which in this example is triangle 200. Additionally, although examples are discussed with reference to combining three shapes, this is for simplicity of explanation and not intended to be limiting, embodiments may process an arbitrary number of shapes (e.g., two or more) in a combination operation.

Once selected, the three shapes are received by shape rendering manager 104 at numeral 1, as discussed above. The shape rendering manager can identify a bounding box 212 large enough to fully encompass at least the union of the three shapes. As shown, the shape rendering manager 104 can apply the appearance of the dominant shape to all of the selected shapes.

The shape rendering manager 104 can then allocate a shape buffer 214 at least as large as the bounding box and set the values of the shape buffer to 0, at numeral 2. Once the shape buffer 214 is zero-initialized, the shape rendering manager 104 can begin populating the shape buffer at numeral 3. For example, the shape rendering manager 104 can record fills of all shapes in the shape buffer. For example, for all pixels belonging to fill of any shape, the shape rendering manager 104 writes a sentinel value '2' in the shape buffer. As discussed, the pixels may be processed in parallel by multiple CPU or GPU threads. For unite operations, the fill pixels of all shapes can be processed in parallel. Once the fills of all of the shapes have been written, then the shape rendering manager 104 can record strokes of all shapes in the shape buffer 214. For example, for all pixels belonging to stroke of any shape, the shape rendering manager 104 put sentinel value '1' in the shape buffer. Because the shapes are being merged, if a fill of one shape overlaps with the stroke of another shape, the fill value overwrites the stroke value. However, stroke values cannot overwrite fill values on unite operations. Thus, stroke pixels where a fill value is already recorded are discarded.

However, in general, equations of Bezier curves are such that half the stroke lies inside (and as such overwrites) the fill, and half lies outside the fill. This means that within a given vector shape, a stroke pixel cannot be discarded when overlapping a fill pixel of that same vector shape. However, across different vector shapes, stroke pixels of one vector shape can be discarded rather than overwriting fill pixels of another vector shape. As such, for unite operations, the fill pixels of every successive shape are marked with a higher sentinel value than the previous shape. Thus, the shape rendering manager 104 uses sentinel '2' for the fill pixels of triangle 200, the shape rendering manager 104 uses sentinel '3' for the fill pixels of oval 202, and the shape rendering manager 104 uses sentinel '4' for the fill pixels of square 204. Such incrementing of sentinel values continues as long as there are additional shapes. For example, a unite operation performed on N shapes would result in using sentinel values up to N+1. While drawing stroke of a shape, the shape rendering manager 104 uses the unique sentinel value of each shape's fill to determine whether to overwrite fill pixels or discard the stroke pixels. For example, the stroke pixels of triangle 200 overwrite pixels in shape buffer 214 having a sentinel value of 2 but are discarded for any pixels in shape buffer having value 3 or 4.

In some embodiments, rather than incrementing sentinel values, different equations can be used to represent the vector shapes being combined. For example, the fill portion of the shape can be shrunk such that a portion of the stroke no longer overlaps the fill, while retaining the same overall size of the vector shapes.

Once the shape buffer has been fully populated with the fill and stroke pixel information, pixel values for the fill and stroke colors can be added to the shape buffer. As discussed, the fill color and stroke color of the dominant shape can be applied to all of the shapes. As a result, at numeral 4, the union of the three shapes is generated having the same fill color 216 and the same stroke width and color 218 as the triangle 200. As shown, the strokes of the shapes that overlap with the fills have been discarded, resulting in a single merged shape.

Figure 3:
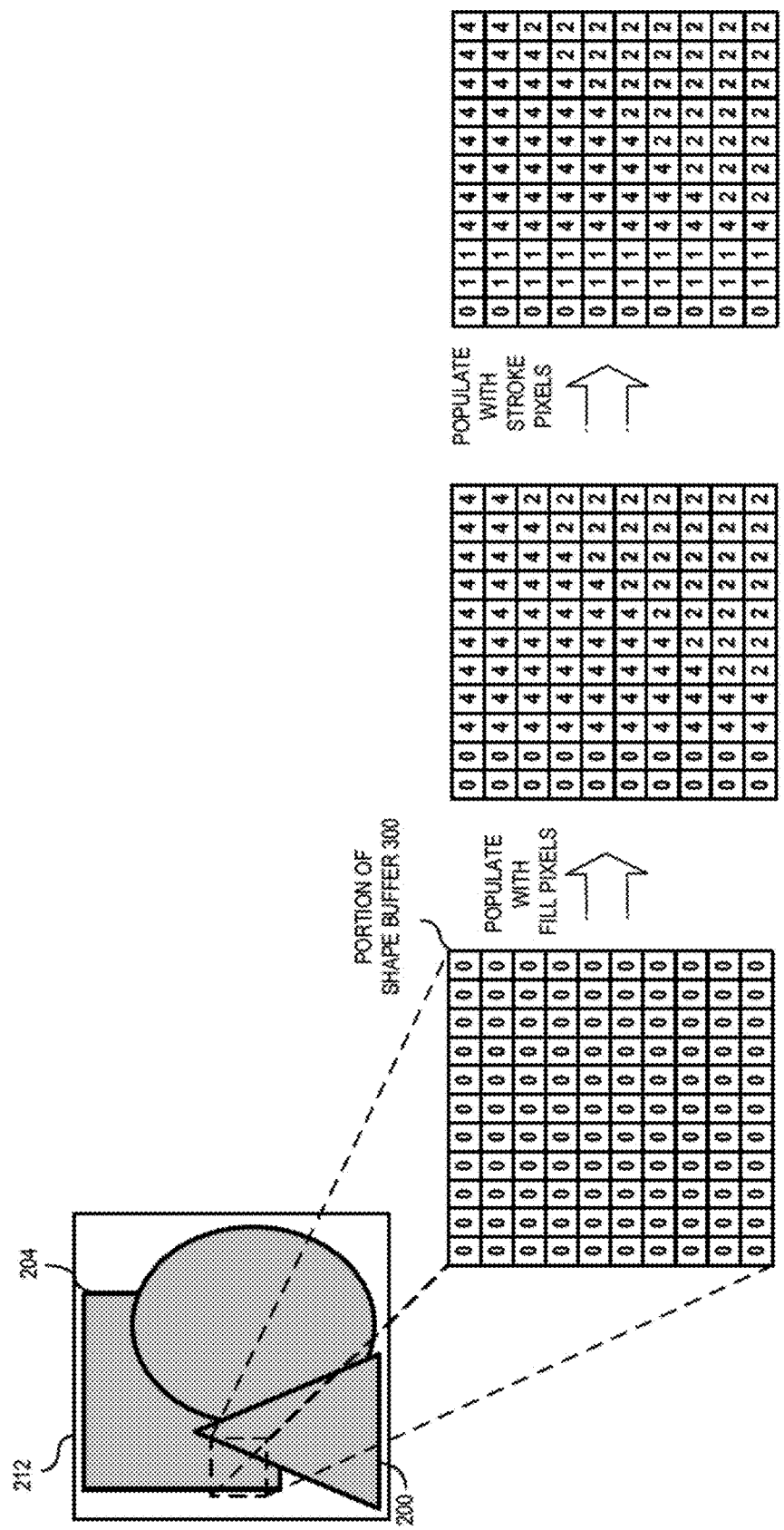
FIG. 3 illustrates a diagram showing the population of a portion of a shape buffer using sentinel values in accordance with one or more embodiments.

FIG. 3 illustrates a diagram showing the population of a portion of a shape buffer using sentinel values in accordance with one or more embodiments. In the example of FIG. 3, a portion 300 of the shape buffer is shown as it is populated with values. As discussed, and as shown in FIG. 3, the square and oval have both been updated to have the same fill color and stroke widths as the triangle 200. As illustrated, the portion of the shape buffer shown corresponds to an overlapping portion of triangle 200 and square 204. As discussed, when a shape buffer is allocated, it can be initialized with all zero values. As shown in FIG. 3, for a unite operation, the pixels of the input shapes are processed, and the shape buffer is first populated with fill pixels of the input shapes. As discussed, for unite operations, the sentinel values for each shape can be incremented so that fill pixels of one shape can be distinguished from fill pixels of another shape. As such, in this example, the fill pixels of triangle 200 are populated with sentinel values of 2 and the fill pixels of square 204 are populated with sentinel values of 4 (sentinel values of 3 are used for oval 202, not shown in this portion of the shape buffer).

Once fill pixels have been populated, the shape buffer can be populated with stroke pixels. As discussed above, due to the way vector shapes are defined, the stroke pixels of square 204 partially overlap with its fill pixels. As such, a portion of the pixels having sentinel values of 4 are overwritten with sentinel values of 1, indicating that these pixels are stroke pixels. Additionally, a portion of the stroke pixels also lie outside the fill pixels of the square. As such, a portion of the shape buffer that had not been written to (e.g., still had initial values of 0) were also overwritten with sentinel values of 1. When the stroke pixels of triangle 200 are processed, the shape rendering manager 104 determines that there are already sentinel values of 4 written to these pixels. Because sentinel values of 4 correspond to fill pixels of a different shape, the stroke pixels of triangle 200 are discarded. This results in removing the portion of the stroke pixels of triangle 200 which overlap with square 204.

Figure 4:
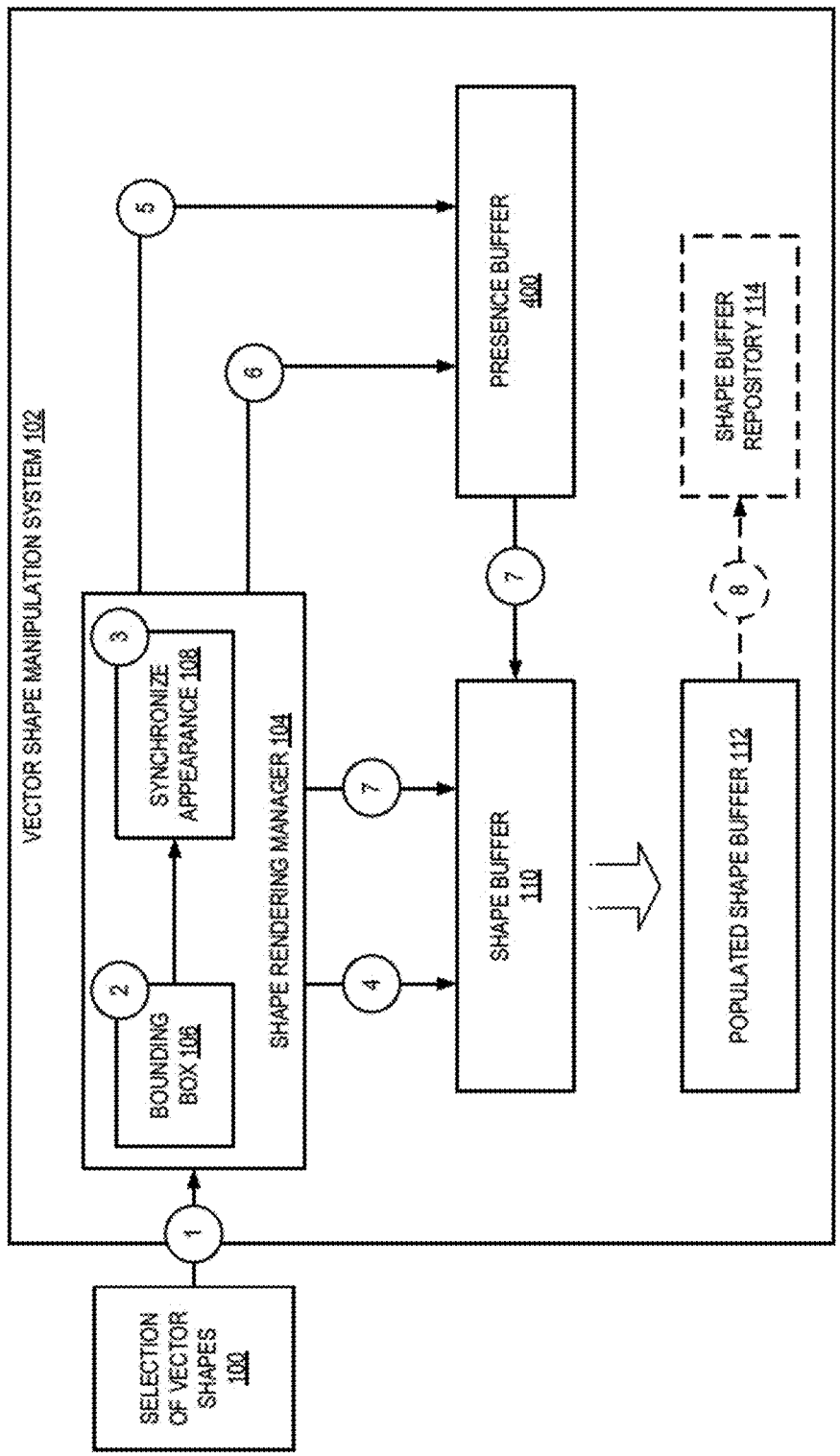
FIG. 4 illustrates a diagram of a process of combining vector graphics shapes in accordance with one or more embodiments.

FIG. 4 illustrates a diagram of a process of combining vector graphics shapes in accordance with one or more embodiments. As discussed above with respect to FIG. 1, embodiments enable multiple 2D vector shapes (e.g., Bezier shapes) to be combined in real time. As shown in FIG. 4, and as discussed above, a user can select a plurality of vector shapes to be combined according to a combination operation in a content design application. The selection of vector shapes 100 can be received by a vector shape manipulation system 102, at numeral 1. For example, once the vector shapes have been selected, the user can select a particular combination operation (e.g., unite, intersect, minus front, minus back, exclude overlap, etc.) to be performed on the selected shapes. In the example shown in FIG. 4, an intersect operation has been selected.

As discussed above, in some embodiments, as a preprocessing step, the shape rendering manager 104 can close any selected shapes that are open by joining the shape's endpoints with a straight line. Once the vector shapes and the combination operation have been selected, a shape rendering manager 104 can identify a bounding box 106 around the selected shapes at numeral 2. The bounding box is at least large enough to include all of the selected shapes. Although a bounding box is described, other bounding shapes may similarly be used. Once a bounding box has been identified, the shape rendering manager 104 can synchronize the appearance 108 of the selected shapes, at numeral 3. The appearance of the shapes (e.g., the stroke characteristics and fill color) can be synchronized based on various factors, as discussed above.

At numeral 4, the shape rendering manager 104 can allocate a shape buffer 110 that is the same size as, or larger than, the bounding box. As discussed, the techniques described herein may be implemented using various processing devices, such as central processing units (CPUs), graphics processing units (GPUs), etc. Depending on implementation, the shape rendering manager can allocate a region of memory that is at least as large as the bounding box, this region may be referred to as a buffer (e.g., when implemented using a CPU) or a texture (e.g., when implemented using a GPU). In the embodiments described herein, this region of memory may be referred to as a buffer or a texture. The shape buffer 110 (or texture, as discussed) may store output pixel values for the pixels included in the bounding box. As discussed, the shape buffer can be initialized with all zero values.

In an intersection operation, only the portion of the selected shapes that is overlapped by all of the intersected shapes is kept, while the remainder of the selected shapes is discarded. As such, the shape rendering manager needs to keep track of how many times a particular pixel has been overlapped by the selected shapes. As shown at numeral 5, the shape rendering manager 104 can allocate a presence buffer 400 (or texture, as discussed), which is the same size as the shape buffer 110 that was allocated. The presence buffer may also be initialized to all zero values. The presence buffer stores a presence value for each pixel of the shape buffer. The presence value indicates the number of times a given pixel is overlapped by a different shape. The shape rendering manager can then record the fill and stroke pixels in the presence buffer. Unlike the shape buffer, where fill and stroke pixels are associated with different sentinel values, in the presence buffer if a pixel is a stroke or fill value, the current value of that pixel can be incremented by one. For example, when the fill and stroke pixels are recorded in the presence buffer for a first shape, those pixels will have a presence value of 1 (e.g., incrementing from zero to one). Likewise, when the fill and stroke pixels are recorded for a second shape, those pixel values will also be incremented, and so on until all shapes have been processed. Accordingly, once the presence buffer has been populated by all of the selected shapes, the pixels having a value equal to the number of selected shapes are the pixels that are overlapped by all of the selected shapes. For example, if three shapes are selected, then those pixels having a presence value of '3' are overlapped by all three shapes. Similarly, if N shapes have been selected, then those pixels having a presence value of 'N' are overlapped by all N shapes.

At numeral 7, using the presence values in populated presence buffer 400, the shape rendering manager can populate the shape buffer 110 with stroke and fill sentinel values only for pixels that have a corresponding presence value of N in presence buffer 400. For example, tor every pixel in the bounding box, the shape rendering manager 104 can record the strokes of all selected shapes in shape buffer 110 where those strokes occur on pixels that have a presence value of N in the presence buffer 400. As discussed, the shape rendering manager 104 can add a sentinel value of '1' to the shape buffer to indicate that a pixel is a stroke pixel. Subsequently, the shape rendering manager can record the fills of all of the selected shapes in shape buffer 110 on pixels having a presence value of N in the presence buffer 400. In accordance with an embodiment, if the shape manager determines that there is an overlap between a fill pixel and a stroke pixel (e.g., if when recording a fill pixel the value of the pixel has already been set to the stroke sentinel value), then the shape rendering manager can discard the fill pixel. As discussed, the output pixels may be processed in parallel as all output pixels of a given input shape can be processed simultaneously or concurrently, while each shape may be processed sequentially. Thus, embodiments produce much faster results by employing multiple CPU threads and/or GPU threads to process the output pixels in parallel.

As discussed, after the shape buffer has been populated with fill and stroke pixel data, resulting in populated shape buffer 112, the appearance of the dominant shape can be applied to the pixels in the shape buffer. This may include adding stroke color and fill color values to the corresponding stroke and fill pixels in the shape buffer. In some embodiments, the contents of the populated shape buffer 112 can be stored to a shape buffer repository 114, at numeral 8. The shape buffer repository may be a separate memory or disk location to store the results of previous combination operations. This enables a shape that has been created via a combination operation to be further combined with one or more additional shapes in a nested combination operation. Alternatively, the populated shape buffer 112 can be maintained in memory and any unrelated combination operations can be performed using a newly allocated shape buffer.

Figure 5:
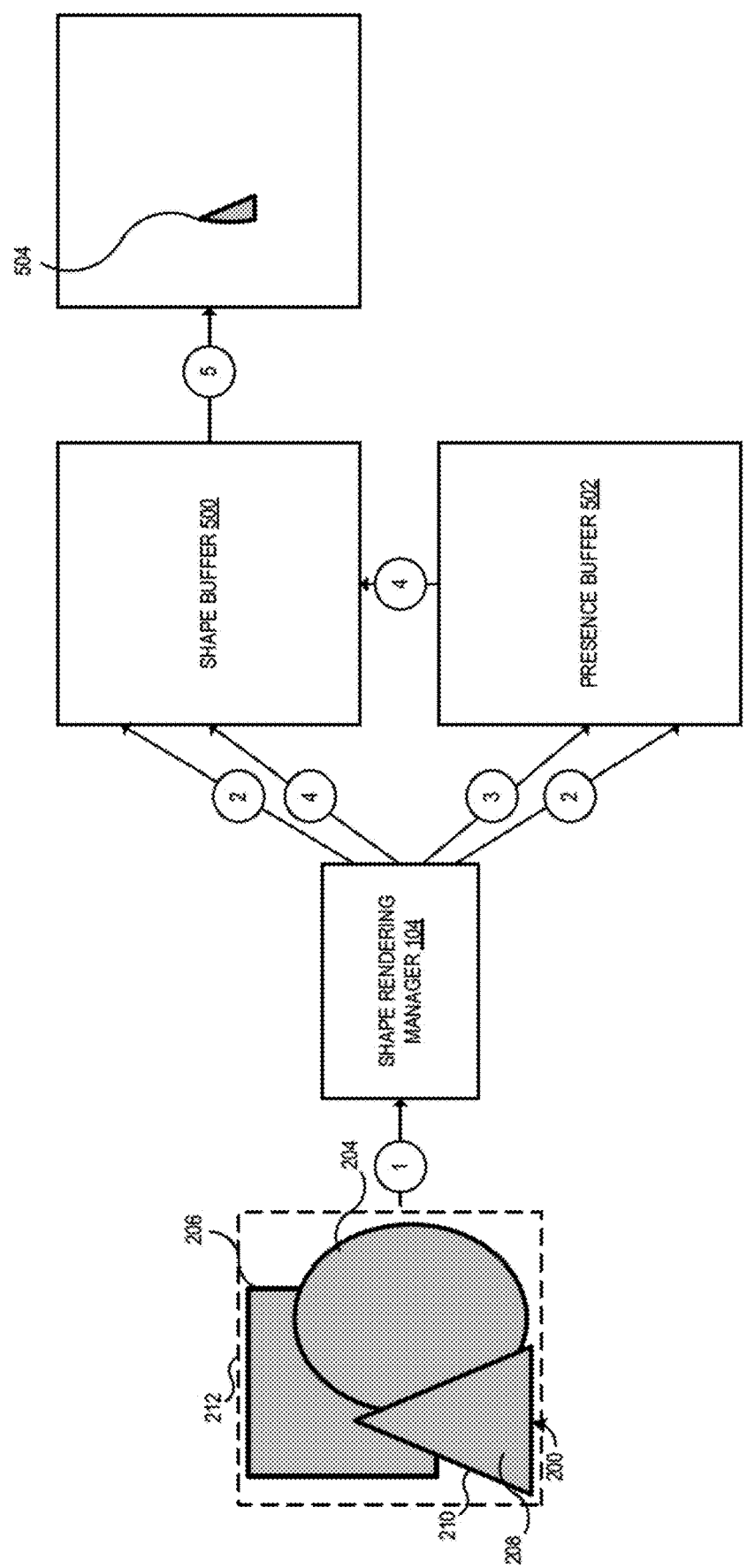
FIG. 5 illustrates a diagram of a process of performing an intersection operation in accordance with one or more embodiments.

FIG. 5 illustrates a diagram of a process of performing an intersection operation in accordance with one or more embodiments. Using the example selected shapes shown in FIG. 2, multiple overlapping shapes can be combined in an intersect operation which finds the intersection of the three shapes and discards anything outside of the intersection. As discussed, once selected, the three shapes are received by shape rendering manager 104 at numeral 1. The shape rendering manager can identify a bounding box 212 large enough to fully encompass at least the union of the three shapes. As shown, the shape rendering manager 104 can apply the appearance of the dominant shape to all of the selected shapes.

The shape rendering manager 104 can then allocate a shape buffer 500 at least as large as the bounding box and a presence buffer 502 the same size as the shape buffer 500, and set the values of both to zero, at numeral 2. At numeral 3, the shape rendering manager 104 can begin populating the presence buffer. As discussed, the shape rendering manager 104 can record fills and strokes of all shapes in the presence buffer by incrementing the current value of the corresponding pixels of the presence buffer. The shapes can be processed sequentially, such as from top-most to bottom-most, bottom-most to top-most, or any other order. Once all of the shapes have been processed, at numeral 4, the shape rendering manager 104 writes sentinel values for the stroke and fill pixels of the selected shapes in the shape buffer at the pixel locations that have presence values equal to the number of shapes being processed. In the example of FIG. 5, the fill and stroke sentinel values are set to pixel locations in the shape buffer that have presence values equal to 3 in the presence buffer. As such, once the shapes have been processed, the intersection 504 of the three shapes remains, and the appearance of the dominant shape can be applied to the fill and stroke pixels, at numeral 5.

Figure 6:
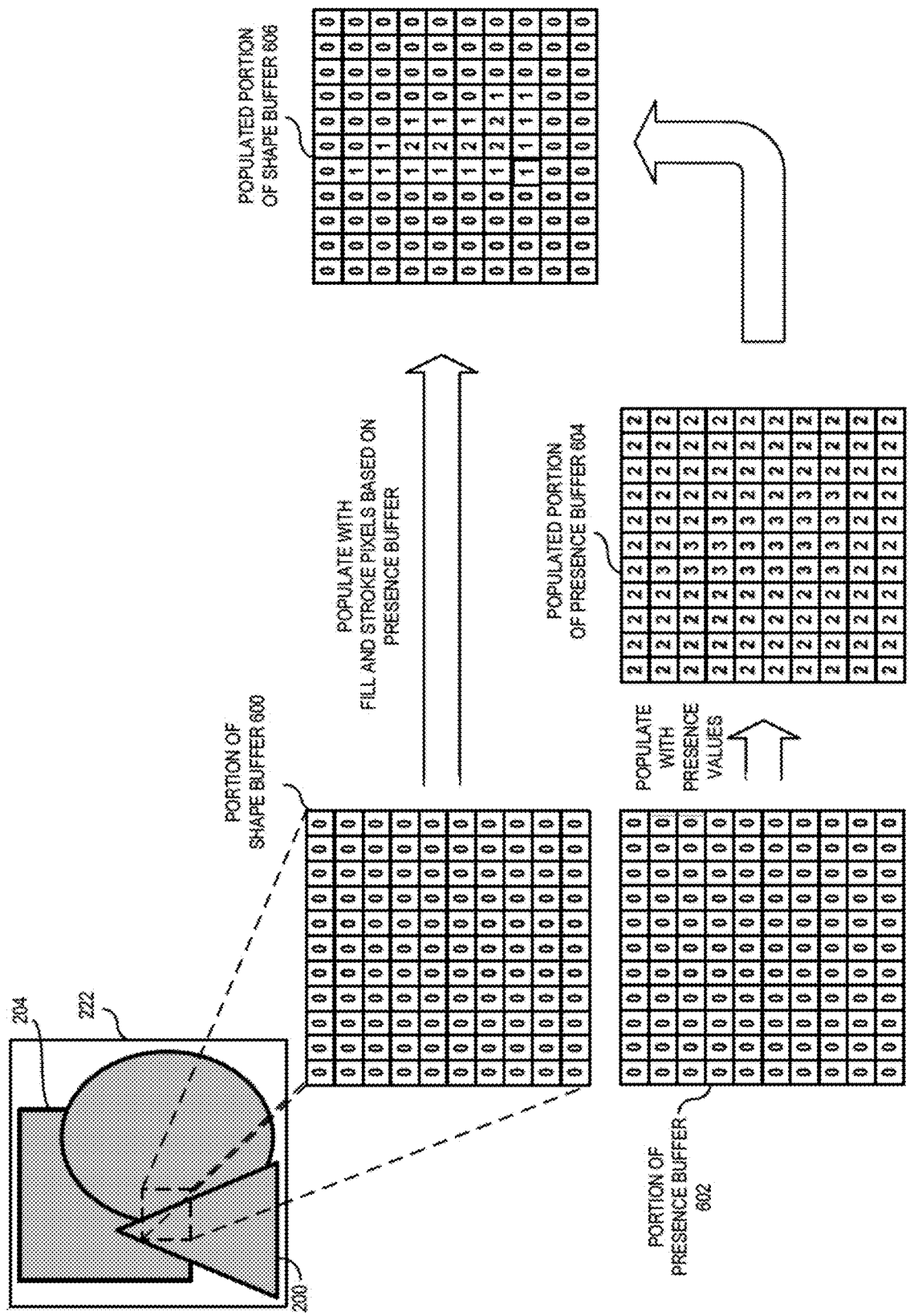
FIG. 6 illustrates a diagram showing the population of a portion of a shape buffer and a portion of a presence buffer using sentinel values in accordance with one or more embodiments.

FIG. 6 illustrates a diagram showing the population of a portion of a shape buffer and a portion of a presence buffer using sentinel values in accordance with one or more embodiments. In the example of FIG. 6, a portion 600 of the shape buffer and a portion 602 of the presence buffer are shown as they are populated with values. As illustrated, the portion of the shape buffer shown includes the intersection of triangle 200, oval 202, and square 204. As discussed, when a shape buffer is allocated, it can be initialized with all zero values. Likewise, when the presence buffer is allocated it can also be initialized with all zero values. As discussed, the presence buffer and the shape buffer are the same size. As shown in FIG. 6, for an intersect operation, the pixels of the input shapes are processed, and the presence buffer is first populated with fill and stroke pixels of each of the input shapes. As shown in this example, the portion 602 of the presence buffer corresponds to an overlapping area of the three shapes. As such, the populated portion 604 of the presence buffer has been populated with presence values of '2' and '3,' corresponding to pixels that are overlapped by two shapes and pixels overlapped by all three shapes.

Once shapes have been processed and the presence buffer has been populated, the shape buffer can be populated with fill and stroke pixels in the pixel locations that have corresponding presence values of '3' in the presence buffer. As shown in the populated portion 606 of the shape buffer, this yields the intersecting portion of the three input shapes while discarding pixels outside of the intersecting portion.

Figure 7:
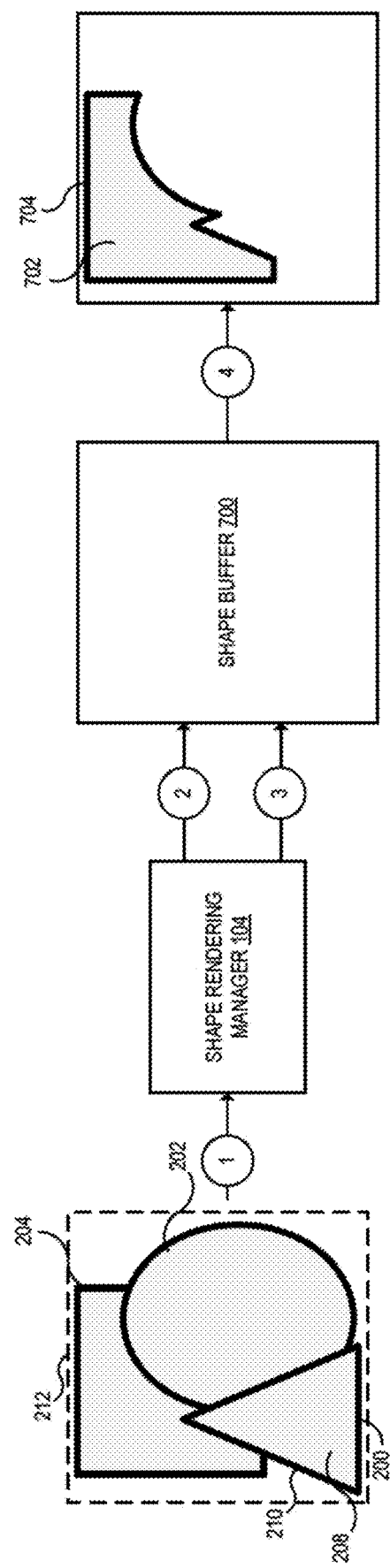
FIG. 7 illustrates a diagram of a process of performing a minus-front operation in accordance with one or more embodiments.

FIG. 7 illustrates a diagram of a process of performing a minus-front operation in accordance with one or more embodiments. Using the example selected shapes shown in FIG. 2, multiple overlapping shapes can be combined in a minus front operation which subtracts the overlapping portions of any shapes above a bottom-most shape. In the example shown in FIG. 7, this results in subtracting the triangle 200 and oval 202, from the square 204. As discussed, once selected, the three shapes are received by shape rendering manager 104 at numeral 1. The shape rendering manager can identify a bounding box 212 large enough to fully encompass at least the union of the three shapes. As shown, the shape rendering manager 104 can apply the appearance of the dominant shape to all of the selected shapes. Because this is a minus front operation, the dominant shape is the bottom-most shape, square 204. As such the fill color and stroke width have been modified on the triangle and oval to match the square by having light gray fill and heavy stroke widths.

The shape rendering manager 104 can then allocate a shape buffer 700 at least as large as the bounding box and set the values of the shape buffer to 0, at numeral 2. Once the shape buffer 700 is zero-initialized, the shape rendering manager 104 can begin populating the shape buffer at numeral 3. For example, the shape rendering manager 104 can record fills of the bottom-most shape, in this example square 204, in the shape buffer. For example, for all pixels belonging to fill of square 204, the shape rendering manager 104 writes a sentinel value '2' in the shape buffer. As discussed, the pixels may be processed in parallel by multiple CPU or GPU threads. Once the fills of the bottom-most shape are recorded, then the stroke of the bottom-most shape can be recorded, where any stroke pixels that overlap fill pixels overwrite the fill pixels. Once the stroke and fill pixels of the bottom-most shape have been recorded, then the fills of all other shapes can be processed. Any fills from the other shapes, e.g., the triangle and the oval, that overlap either stroke or fill pixels of the bottom-most shape, e.g., the square, cause the existing sentinel values to be overwritten with a sentinel value of '0'. This will result in discarding the overlapping fill areas from the bottom-most shape. Any fills that do not overlap with the bottom-most shape (e.g., the existing sentinel value is '0') are discarded.

Once fills have been processed, then the strokes of the other shapes can be processed. Whether a stroke is recorded depends on the existing sentinel value in the shape buffer. For example, if the existing sentinel value corresponding to the pixel being processing is '0', then the pixel is discarded. For example, if the stroke is in a location where there is no fill or stroke from the bottom-most shape then it corresponds to a portion of a shape that is being discarded. If the existing sentinel value is a '1' or a '2' then the sentinel value is set to 1. This ensures that a stroke is added to the portions of the other shapes that overlap the bottom-most shape. Once the stroke and fill pixels of the other shapes have been processed, the color data for the fill 702 and stroke 704 of the dominant shape can be applied to the shape buffer, as shown at numeral 4.

Figure 8:
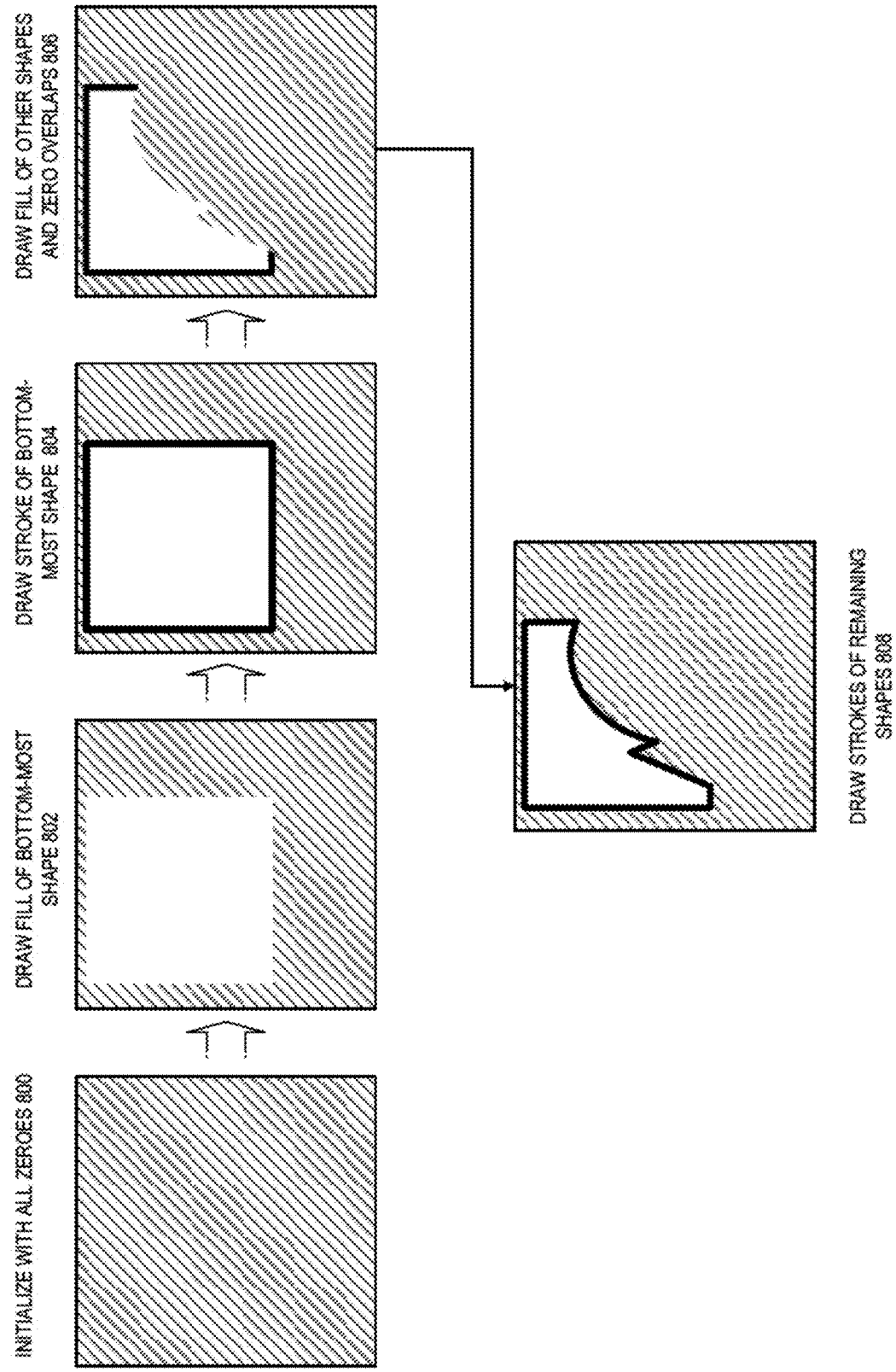
FIG. 8 illustrates a diagram showing the population of a shape buffer in accordance with one or more embodiments.

FIG. 8 illustrates a diagram showing the population of a shape buffer in accordance with one or more embodiments. As shown in FIG. 8, a shape buffer can be initialized with all zeros at 800. In this example, the value of portions of the shape buffer are indicated by color or pattern. For example, zero values are indicated by a hatched pattern, fill values are indicated by white, and stroke values are indicated by black. As discussed, for a minus front operation, the fill pixels for the bottom-most shape are recorded first. As shown at 802, this results in the fill pixels of square 204 being recorded in the shape buffer.

After the fill pixels of the bottom-most shape have been recorded, the stroke pixels of the bottom-most shape are recorded. As shown at 804, this results in the stroke and fill pixels of the square 204 being recorded, and any overlap between the stroke pixels and the fill pixels of the square result in the stroke pixels overwriting the fill pixels. At 806, the fill pixels of the remaining shapes are recorded. As discussed, fill pixels are processed and if the existing sentinel value is '0' then the fill pixels are discarded and if the sentinel values are '1' or '2' they are set of '0'. The result is shown at 806, where the overlapping fill portions of triangle 200 and oval 202 have been set to zero, as represented by the hatch pattern. Finally, at 808, the stroke pixels of the triangle and oval are processed. As discussed, the stroke sentinel value of '1' is recorded to the shape buffer where the existing sentinel value is either '1' or '2', corresponding to portions of the bottom-most shape that remain after discarding the overlapping portions at 806. As a result, the stroke pixels of the portions of the triangle and oval that overlap with the square are added to the shape buffer, as shown at 808.

Figure 9:
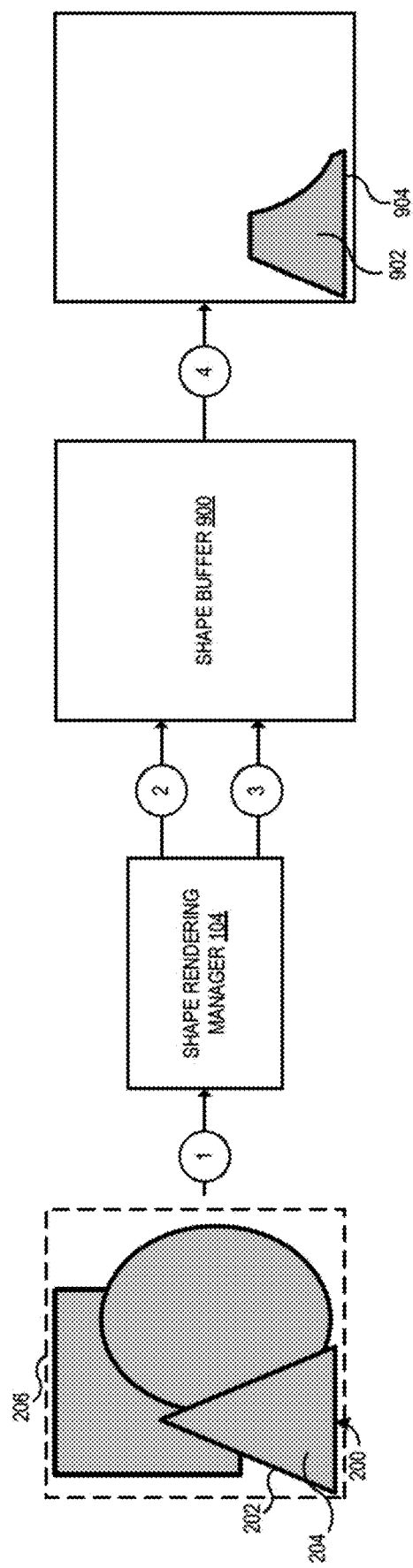
FIG. 9 illustrates a diagram of a process of performing a minus-back operation in accordance with one or more embodiments.

FIG. 9 illustrates a diagram of a process of performing a minus-back operation in accordance with one or more embodiments. Using the example selected shapes shown in FIG. 2, multiple overlapping shapes can be combined in a minus back operation which subtracts the overlapping portions of any shapes under a top-most shape. In the example shown in FIG. 9, this results in subtracting the square 204 and oval 202, from the triangle 200. As discussed, once selected, the three shapes are received by shape rendering manager 104 at numeral 1. The shape rendering manager can identify a bounding box 212 large enough to fully encompass at least the union of the three shapes. As shown, the shape rendering manager 104 can apply the appearance of the dominant shape to all of the selected shapes. Because this is a minus back operation, the dominant shape is the top-most shape, triangle 200. As such the fill color and stroke width have been modified on the square and oval to match the triangle by having medium gray fill and medium stroke widths.

The shape rendering manager 104 can then allocate a shape buffer 900 at least as large as the bounding box and set the values of the shape buffer to 0, at numeral 2. Once the shape buffer 900 is zero-initialized, the shape rendering manager 104 can begin populating the shape buffer at numeral 3. For example, the shape rendering manager 104 can record fills of the top-most shape, in this example triangle 200, in the shape buffer. For example, for all pixels belonging to fill of triangle 200, the shape rendering manager 104 writes a sentinel value '2' in the shape buffer. As discussed, the pixels may be processed in parallel by multiple CPU or GPU threads. Once the fills of the top-most shape are recorded, then the stroke of the top-most shape can be recorded, where any stroke pixels that overlap fill pixels overwrite the fill pixels. Once the stroke and fill pixels of the top-most shape have been recorded, then the fills of all other shapes can be processed. Any fills from the other shapes, e.g., the square and the oval, that overlap either stroke or fill pixels of the top-most shape, e.g., the triangle, cause the existing sentinel values to be overwritten with a sentinel value of '0'. This will result in discarding the overlapping fill areas from the top-most shape. Any fills that do not overlap with the top-most shape (e.g., the existing sentinel value is '0') are discarded.

Once fills have been processed, then the strokes of the other shapes can be processed. Whether a stroke is recorded depends on the existing sentinel value in the shape buffer. For example, if the existing sentinel value corresponding to the pixel being processing is '0', then the pixel is discarded. For example, if the stroke is in a location where there is no fill or stroke from the top-most shape then it therefore corresponds to a portion of a shape that is being discarded. If the existing sentinel value is a '1' or a '2' then the sentinel value is set to 1. This ensures that a stroke is added to the portions of the other shapes that overlap the top-most shape. Once the stroke and fill pixels of the other shapes have been processed, the color data for the fill 902 and stroke 904 of the dominant shape can be applied to the shape buffer, as shown at numeral 4.

Figure 10:
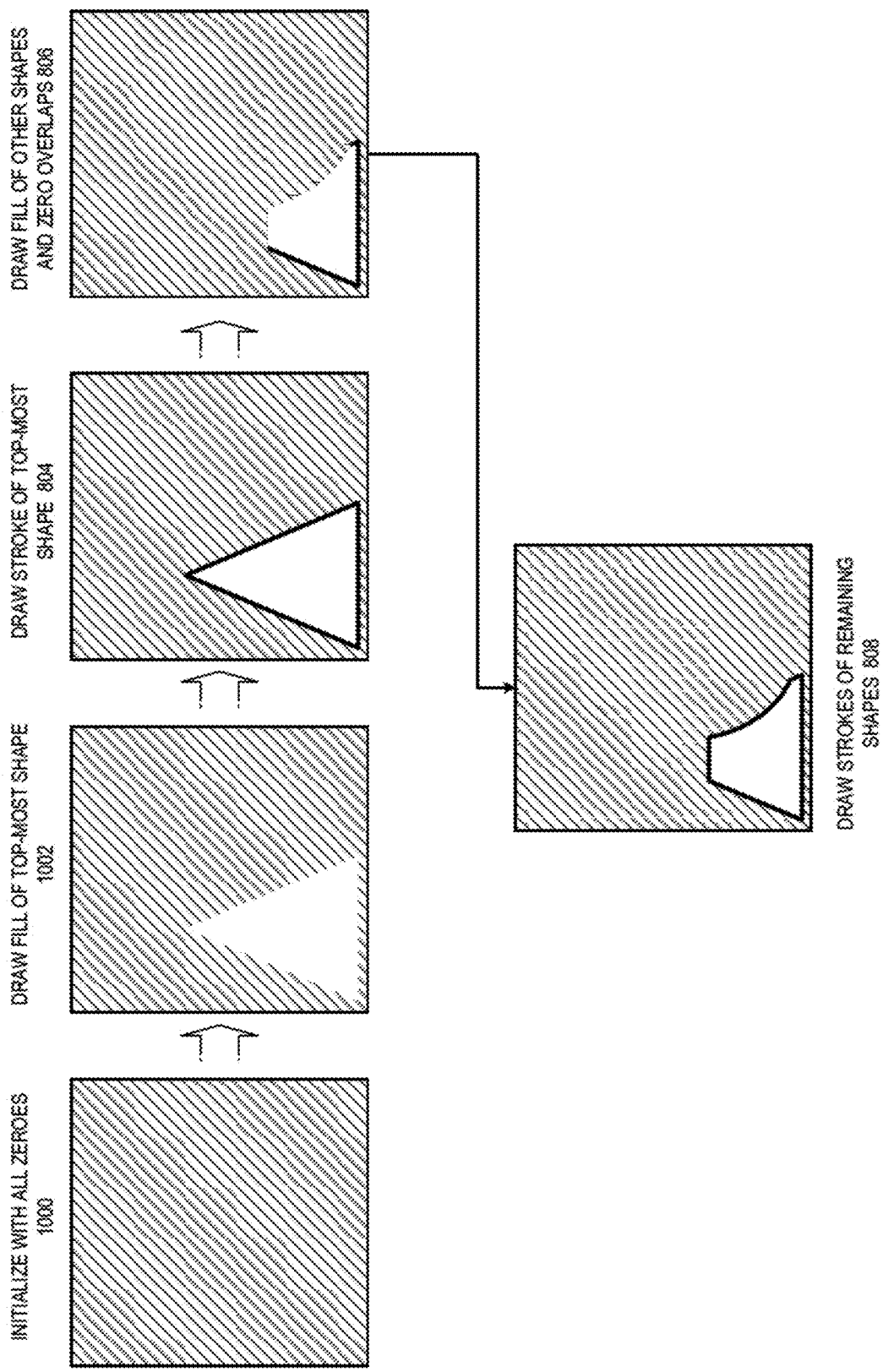
FIG. 10 illustrates a diagram showing the population of a shape buffer in accordance with one or more embodiments.

FIG. 10 illustrates a diagram showing the population of a shape buffer in accordance with one or more embodiments. As shown in FIG. 10, a shape buffer can be initialized with all zeros at 1000. In this example, the value of portions of the shape buffer are indicated by color or pattern. For example, zero values are indicated by a hatched pattern, fill values are indicated by white, and stroke values are indicated by black. As discussed, for a minus back operation, the fill pixels for the top-most shape are recorded first. As shown at 1002, this results in the fill pixels of triangle 200 being recorded in the shape buffer.

After the fill pixels of the bottom-most shape have been recorded, the stroke pixels of the top-most shape are recorded. As shown at 1004, this results in the stroke and fill pixels of the triangle 200 being recorded, and any overlap between the stroke pixels and the fill pixels of the triangle result in the stroke pixels overwriting the fill pixels. At 1006, the fill pixels of the remaining shapes are recorded. As discussed, fill pixels are processed and if the existing sentinel value is '0' then the fill pixels are discarded and if the sentinel values are '1' or '2' they are set of '0'. The result is shown at 1006, where the overlapping fill portions of square 204 and oval 202 have been set to zero, as represented by the hatch pattern. Finally, at 1008, the stroke pixels of the square and oval are processed. As discussed, the stroke sentinel value of '1' is recorded to the shape buffer where the existing sentinel value is either '1' or '2', corresponding to portions of the top-most shape that remain after discarding the overlapping portions at 1006. As a result, the stroke pixels of the portions of the square and oval that overlap with the triangle are added to the shape buffer, as shown at 1008.

Figure 11:
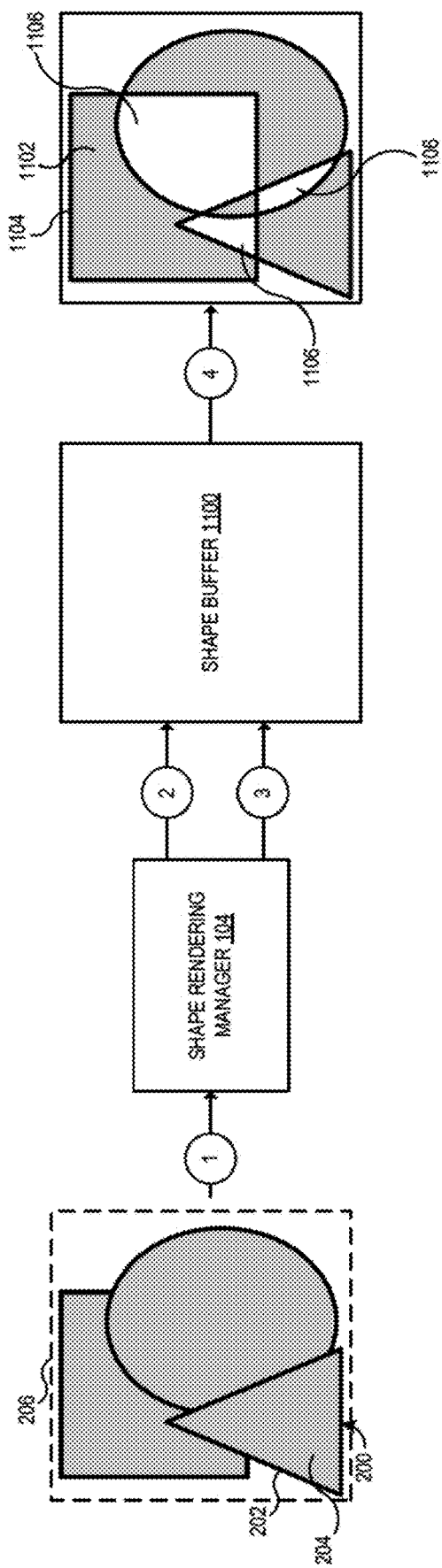
FIG. 11 illustrates a diagram of a process of performing an exclude overlap operation in accordance with one or more embodiments.

FIG. 11 illustrates a diagram of a process of performing an exclude overlap operation in accordance with one or more embodiments. Using the example selected shapes shown in FIG. 2, multiple overlapping shapes can be combined in an exclude overlap operation which toggles the overlapping portions of the shapes, such that any portions overlapped by an even number of shapes are discarded while any portions overlapped by an odd number of shapes are kept. As discussed, once selected, the three shapes are received by shape rendering manager 104 at numeral 1. The shape rendering manager can identify a bounding box 212 large enough to fully encompass at least the union of the three shapes. As shown, the shape rendering manager 104 can apply the appearance of the dominant shape to all of the selected shapes. Because this is an exclude overlap operation, the dominant shape is the top-most shape, triangle 200. As such the fill color and stroke width have been modified on the square and oval to match the triangle by having medium gray fill and medium stroke widths.

The shape rendering manager 104 can then allocate a shape buffer 1100 at least as large as the bounding box and set the values of the shape buffer to 0, at numeral 2. Once the shape buffer 1100 is zero-initialized, the shape rendering manager 104 can begin populating the shape buffer at numeral 3. For example, the shape rendering manager 104 can record fills of all of the shapes in the shape buffer. However, when recording the fills, if an existing sentinel value indicates that the pixel is already marked as a fill pixel (e.g., the sentinel value is '2'), then the sentinel value is overwritten with '0'. As a result, if a pixel is overlapped by an even number of shapes, it is discarded, but if it is overlapped by an odd number of shapes, it is recorded. For example, for all pixels belonging to fill of triangle 200, the shape rendering manager 104 writes a sentinel value '2' in the shape buffer. As discussed, the pixels may be processed in parallel by multiple CPU or GPU threads. Then the fill pixels of the oval can be processed and any overlapping portions with the triangle are set to '0' and the rest of the fill pixels are recorded. Then the fill pixels of the square are processed and any overlapping portions with only the triangle or only the oval are discarded while the rest are recorded.

Once fills have been processed, then the strokes of all of the shapes can be processed. All stroke pixels of the shapes are recorded, and if there is overlap with a fill pixel it is overwritten with the stroke pixel sentinel value. Once the stroke and fill pixels of the other shapes have been processed, the color data for the fill 1102 and stroke 1104 of the dominant shape can be applied to the shape buffer, as shown at numeral 4. As a result, the areas 1106 that are overlapped by only two of the shapes have been discarded.

Figure 12:
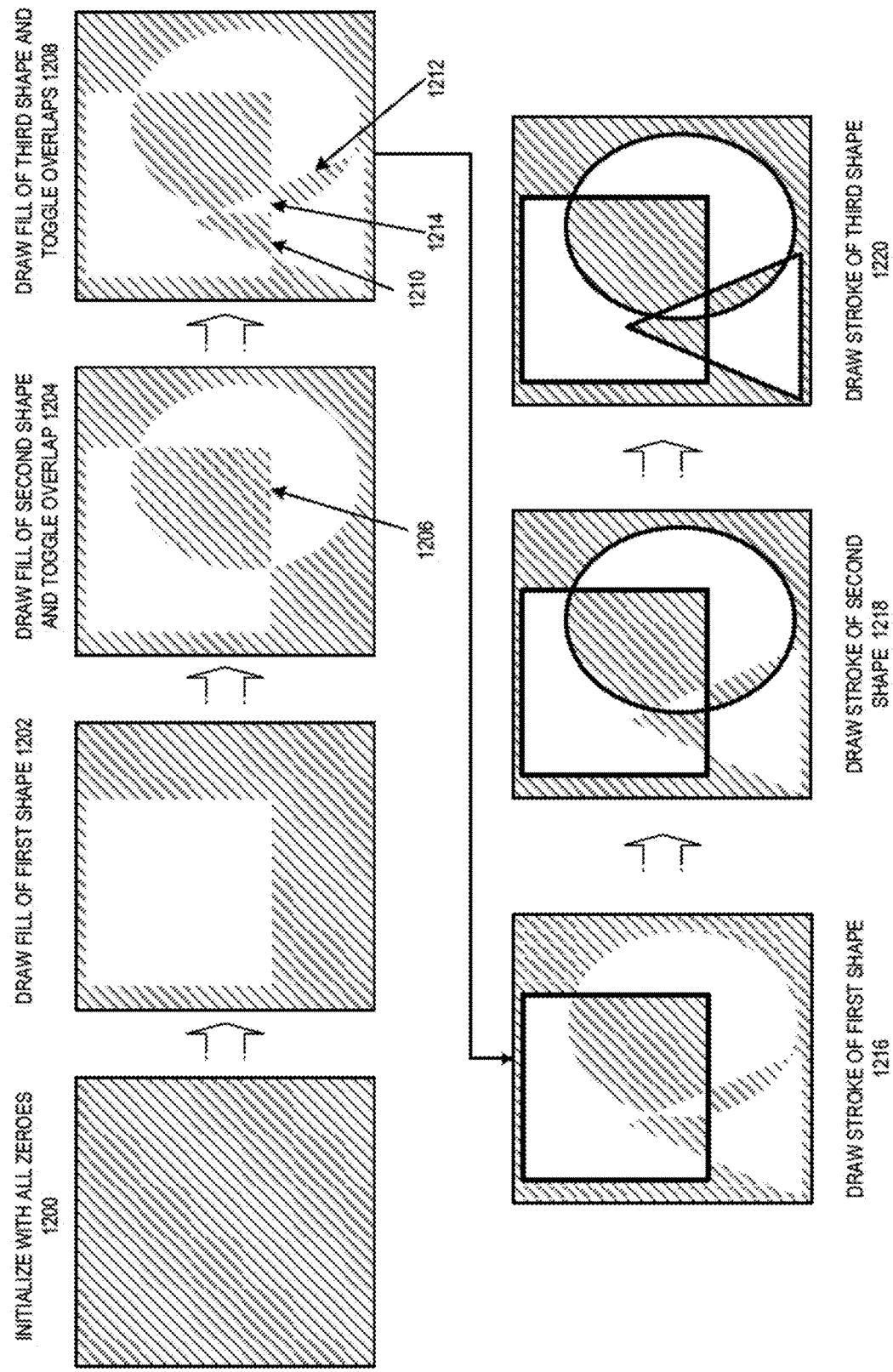
FIG. 12 illustrates a diagram showing the population of a shape buffer in accordance with one or more embodiments.

FIG. 12 illustrates a diagram showing the population of a shape buffer in accordance with one or more embodiments. As shown in FIG. 12, a shape buffer can be initialized with all zeros at 1200. In this example, the value of portions of the shape buffer are indicated by color or pattern. For example, zero values are indicated by a hatched pattern, fill values are indicated by white, and stroke values are indicated by black. As discussed, for an exclude overlap operation, the fill pixels for the shapes are recorded first. As shown at 1202, this results in the fill pixels of square 204 being recorded in the shape buffer.

After the fill pixels of a first shape have been recorded, the stroke pixels of a second shape are recorded. As shown at 1204, this results in the fill pixels of the oval 202 being recorded, and any overlap between the fill pixels of the oval and the fill pixels of the square result in the sentinel values being set to '0'. For example, this results in the area indicated at 1206 being set to '0'. At 1208, the fill pixels of a third shape are recorded. As shown at 1208, this results in the fill pixels of the triangle 200 being recorded and any areas where the triangle only overlaps with the square (e.g., area 1210) or where the triangle only overlaps with the oval (e.g., 1212) have their sentinel values set to '0'. This results in these areas 1210, 1212 being discarded. However, because the sentinel values in region 1214 were previously set to zero at 1204, these fills are recorded. As discussed, this results in toggling fills depending on whether they are overlapped an even or an odd number of times. At 1216-1220, the strokes of the three shapes are recorded, overwriting any fill values from the shapes they happen to overlap with.

Figure 13:
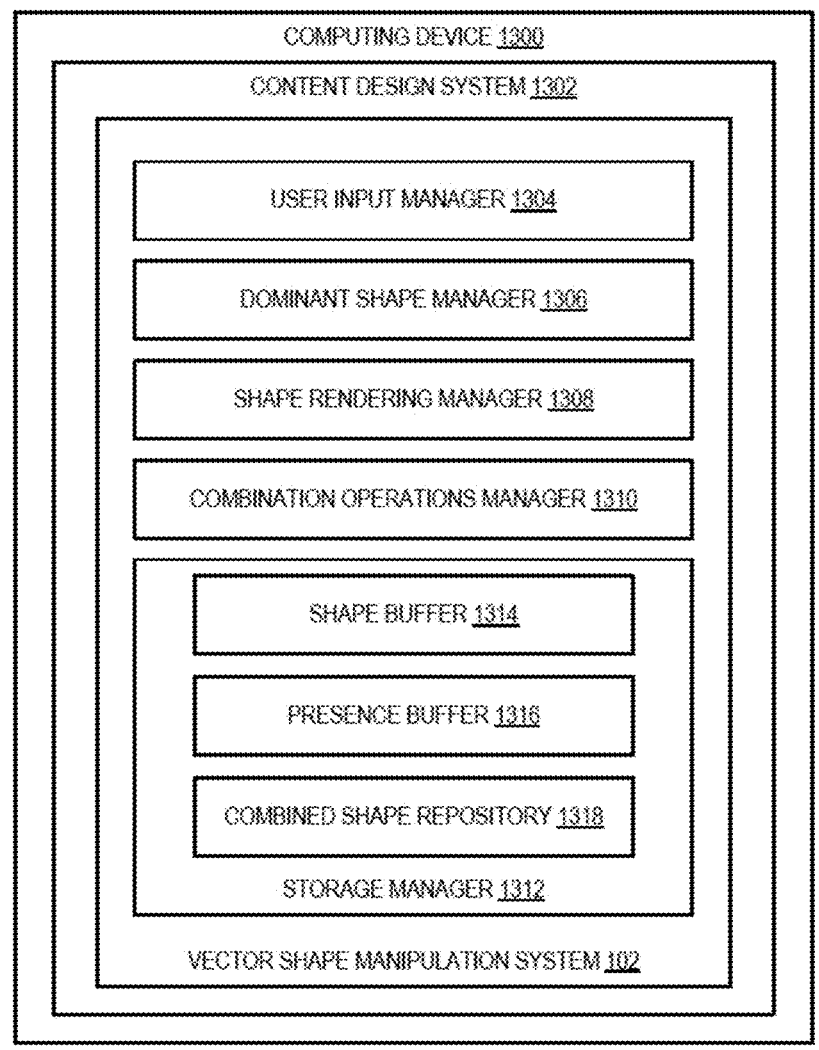
FIG. 13 illustrates a schematic diagram of vector shape manipulation system in accordance with one or more embodiments.

FIG. 13 illustrates a schematic diagram of vector shape management system in accordance with one or more embodiments. In particular, FIG. 13 shows a schematic diagram of the vector shape manipulation system 102, a computing device 1300, and the content design system 1302. In one or more embodiments, some or all of the components of the vector shape manipulation system 102 can be implemented separately from the content design system 1302 and the computing device 1300. For example, all or portions of the rendering system may be implemented on a server computing device.

As illustrated in FIG. 13, the vector shape manipulation system 102 includes user input manager 1304 that allows users to provide input to the content design system. For example, the user input manager 1304 allows users to select one or more vector graphics shapes to be combined by the vector shape manipulation system 102 based on a combination operation In some embodiments, the user input manager 1304 enables a user to select one or more vector graphics files stored or accessible by storage manager 1312 to view and/or edit.

As illustrated in FIG. 13, the vector shape manipulation system 102 also includes a dominant shape manager 1306. As discussed, the dominant shape may vary from combination operation to combination operation and/or based on user selection of a dominant shape. The dominant shape manager 1306 can maintain data for the shape rendering manager 1308 to determine a dominant shape for a given combination operation. For example, the dominant shape manager 1306 can maintain a default dominant shape for each combination operation supported by the vector shape manipulation system 102. For example, as discussed, the top-most shape may be the default dominant shape for unite, intersect, minus back, and exclude overlap operations, while the bottom-most shape may be the default dominant shape for minus front operations. Additionally, or alternatively, the dominant shape manager may receive a selection of a dominant shape by a user via the user input manager. During a combination operation the shape rendering manager can determine the dominant shape for the combination operation based on the dominant shape data maintained by the dominant shape manager.

As illustrated in FIG. 13, the vector shape manipulation system 102 also includes a shape rendering manager 1308. As discussed above, the shape rendering manager 1308 can perform combination operations on selected overlapping input shapes. For example, as discussed, the shape rendering manager 1308 can receive a selection of a plurality of overlapping vector shapes. The shape rendering manager 1308 can determine a union bounding box that includes the selected shapes and also apply the appearance of a dominant shape to all of the shapes. As discussed, the dominant shape can be determined based on data maintained by the dominant shape manager 1306. The shape rendering manager can then allocate a shape buffer and, for intersect operations, a presence buffer. The shape rendering manager can then process the input shapes to populate the shape buffer with sentinel values indicating whether a given pixel is a fill pixel or a stroke pixel according to the combination operation being performed. Once the shape buffer has been populated, the shape buffer can be scanned and the color data of the dominant shape (e.g., the stroke color and fill color) can be applied to the pixels in the shape buffer.

As illustrated in FIG. 13, the vector shape manipulation system 102 also includes one or more combination operations manager 1310. As discussed above, various combination operations may be supported by the vector shape manipulation system, such as the unite, intersect, minus back, minus front, and exclude overlap operations discussed above. As discussed above, each operation varies in its memory requirements, order of processing shapes, order in processing pixel types, etc. The combination operations manager can define these different requirements of each combination operations. For example, the combination operations manager 1310 can include instructions that the shape rendering manager 1308 uses to perform the various combination operations discussed above. Additionally, in some embodiments, additional combination operations may be supported by updating the combination operations manager 1310 to include a definition for the new operation.

As illustrated in FIG. 13, the vector shape manipulation system 102 also includes the storage manager 1312. The storage manager 1312 maintains data for the vector shape manipulation system 102. The storage manager 1312 can maintain data of any type, size, or kind as necessary to perform the functions of the vector shape manipulation system 102. The storage manager 1312, as shown in FIG. 13, includes shape buffer 1314 and presence buffer 1316 as well as a combined shape repository 1318. As discussed above, the shape buffer 1314 can be allocated at the request of the shape rendering manager 1308 and may be of a size at least as large as a bounding box around a union of the selected shapes. A shape buffer 1314 can be allocated for each combination operation being performed. Similarly, a presence buffer 1316 can be allocated at the request of the shape rendering manager 1308 and may be equal in size to a shape buffer 1314 that is also allocated as part of the same combination operation. The presence buffer may be allocated for intersect operations, as discussed above. In some embodiments, the storage manager 1312 may also facilitate the storage of shape buffers that represent completed combination operations. These shape buffers can be used to perform subsequent combination operations on previously combined shapes.

Embodiments described above outperform existing techniques for combining vector graphics shapes. For example, embodiments have been compared to conventional approaches to combining vector shapes, as shown in Table 1, below.

TABLE 1

Experimental Performance Comparison

| Number of rectangles | Frames-per-second (higher is better) Our Approach // Existing Approach | | | | |
|---|---|---|---|---|---|
| | Unite | Intersect | Minus Front | Minus Back | Exclude Overlap |
| 10 | 103 // 94 | 100 // 94 | 99 // 91 | 99 // 90 | 100 // 63 |
| 25 | 95 // 63 | 93 // 62 | 99 // 62 | 95 // 62 | 95 // 24 |
| 50 | 89 // 29 | 88 // 30 | 88 // 29 | 89 // 29 | 90 // 7 |
| 100 | 70 // 8 | 72 // 8 | 73 // 8 | 72 // 8 | 71 // 2 |
| 250 | 53 // 0 | 54 // 0 | 54 // 0 | 54 // 0 | 51 // Unusable |
| 500 | 38 // Unusable | 39 // Unusable | 38 // Unusable | 39 // Unusable | 35 // Unusable |

In Table 1, the performance of embodiments is measured against a conventional approach that geometrically solves shape intersections for combination operations. The experiments represented in Table 1 were performed using an iPad Pro 11-inch with 8 CPU cores and 7 GPU cores. The input shapes were rectangles, and the number of rectangles involved in a single operation were increased from 10 to 500, as shown in Table 1. As shown in Table 1, the performance of embodiments described herein, as measured in frames per second, were performant (e.g., performed at greater than 30 frames per second), with similar performance results across all operations for a given number of input rectangles. However, the performance of the existing approach degrades rapidly as the number of rectangles increases, becoming largely unusable by 100 input rectangles. Additionally, the performance degrades more quickly with operations that require more calculations of shape intersections to be performed, such as exclude overlap.

To support nesting (e.g., where the result of a first combination operation is subject to a different combination operation with a different set of shapes), the pixel data stored in a shape buffer needs to be reused for the next combination operation. In other words, the shape buffer is used as the representative for the corresponding combination operation and acts a shape in the subsequent combination operation. The sentinels '1' in the shape buffer then represent stroke pixels of this shape while sentinels '2' in the shape buffer represent fill pixels of this shape and the next combination operation can be performed using this information.

In alternative embodiments, instead of drawing fills of all shapes first and strokes of all shapes later, one can draw fills and strokes of a first shape upfront, followed by fills and strokes of a second shape, and so on. In such embodiments, a secondary buffer may be used to hold shape references (e.g., indices or sentinel values) for some combination operations.

Each of the components 1304-1318 of the vector shape manipulation system 132 and their corresponding elements (as shown in FIG. 13) may be in communication with one another using any suitable communication technologies. It will be recognized that although components 1304-1318 and their corresponding elements are shown to be separate in FIG. 13, any of components 1304-1318 and their corresponding elements may be combined into fewer components, such as into a single facility or module, divided into more components, or configured into different components as may serve a particular embodiment.

The components 1304-1318 and their corresponding elements can comprise software, hardware, or both. For example, the components 1304-1318 and their corresponding elements can comprise one or more instructions stored on a computer-readable storage medium and executable by processors of one or more computing devices. When executed by the one or more processors, the computer-executable instructions of the vector shape manipulation system 102 can cause a client device and/or a server device to perform the methods described herein. Alternatively, the components 1304-1318 and their corresponding elements can comprise hardware, such as a special purpose processing device to perform a certain function or group of functions. Additionally, the components 1304-1318 and their corresponding elements can comprise a combination of computer-executable instructions and hardware.

Furthermore, the components 1304-1318 of the vector shape manipulation system 102 may, for example, be implemented as one or more stand-alone applications, as one or more modules of an application, as one or more plug-ins, as one or more library functions or functions that may be called by other applications, and/or as a cloud-computing model. Thus, the components 1304-1318 of the vector shape manipulation system 102 may be implemented as a stand-alone application, such as a desktop or mobile application. Furthermore, the components 1304-1318 of the vector shape manipulation system 102 may be implemented as one or more web-based applications hosted on a remote server. Alternatively, or additionally, the components of the vector shape manipulation system 102 may be implemented in a suit of mobile device applications or "apps." To illustrate, the components of the vector shape manipulation system 102 may be implemented in a content design application, including but not limited to ADOBE® PHOTOSHOP® and ADOBE® ILLUSTRATOR®. "ADOBE®," "PHOTOSHOP®," and "ILLUSTRATOR®" are either registered trademarks or trademarks of Adobe Inc. in the United States and/or other countries.

Figure 14:
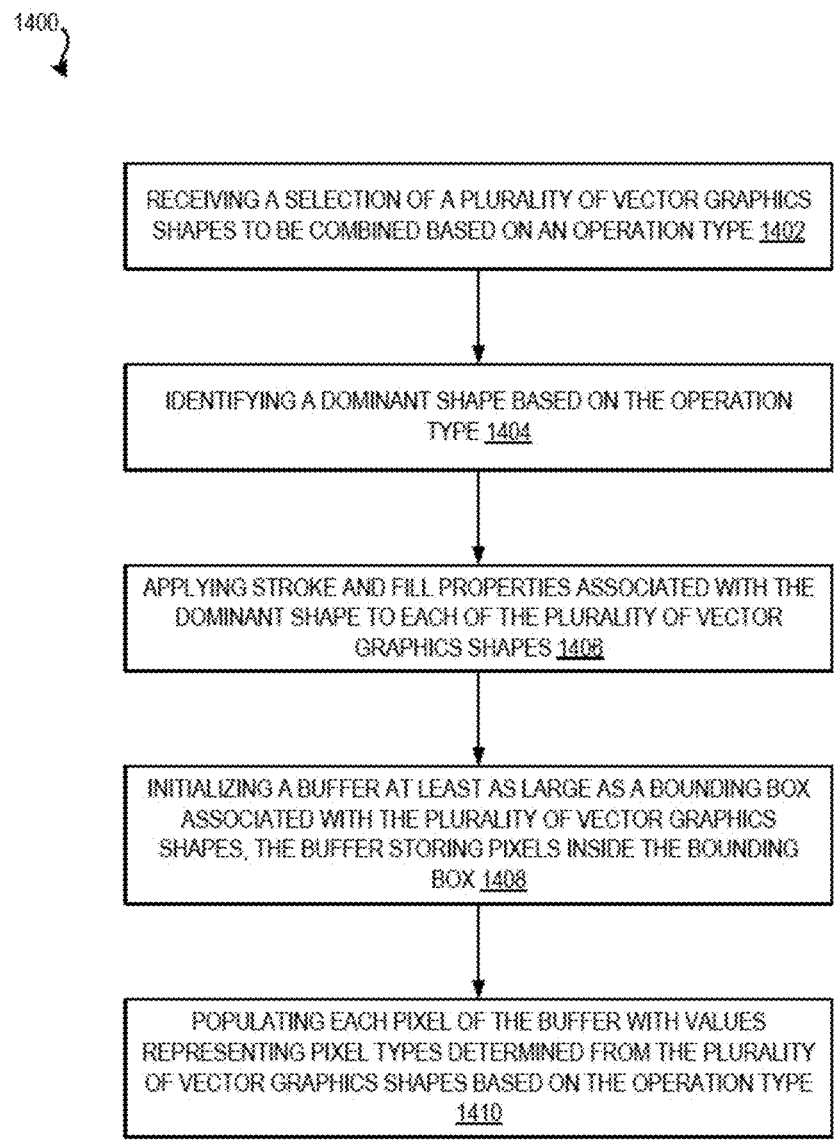
FIG. 14 illustrates a flowchart of a series of acts in a method of combining vector graphics shapes in accordance with one or more embodiments.

FIGS. 1-13, the corresponding text, and the examples, provide a number of different systems and devices that allows a user to facilitate selection of target individuals within digital visual media. In addition to the foregoing, embodiments can also be described in terms of flowcharts comprising acts and steps in a method for accomplishing a particular result. For example, FIG. 14 illustrates a flowchart of an exemplary method in accordance with one or more embodiments. The method described in relation to FIG. 14 may be performed with less or more steps/acts or the steps/acts may be performed in differing orders. Additionally, the steps/acts described herein may be repeated or performed in parallel with one another or in parallel with different instances of the same or similar steps/acts.

FIG. 14 illustrates a flowchart of a series of acts in a method 1400 of combining vector graphics shapes in accordance with one or more embodiments. In one or more embodiments, the method 1400 is performed in a digital medium environment that includes the vector shape manipulation system 102. The method 1400 is intended to be illustrative of one or more methods in accordance with the present disclosure and is not intended to limit potential embodiments. Alternative embodiments can include additional, fewer, or different steps than those articulated in FIG. 14.

As illustrated in FIG. 14, the method 1400 includes an act 1402, by a user input manager of a vector shape manipulation system, of receiving a selection of a plurality of vector graphics shapes to be combined based on an operation type. For example, the user can select two or more vector graphics shapes using a user input device (e.g., mouse, keyboard, touchscreen, etc.) in a content design application and select a GUI element corresponding to a combination operation. Once the combination operation is selected, the selected shapes are provided to the vector shape manipulation system via the user input manager.

As illustrated in FIG. 14, the method 1400 further includes an act 1404, by a dominant shape manager of the vector shape manipulation system, of identifying a dominant shape based on the operation type. In some embodiments, the dominant shape can be determined by receiving a selection of the dominant shape from the plurality of vector graphics shapes. As discussed, the dominant shape manager can determine the dominant shape based on a default dominant shape associated with each combination operation type. In some embodiments, the user can select a dominant shape for a particular combination operation which overrides any default dominant shape associated with a given combination operation type. For example, the dominant shape may be specified by the user based on the order in which the vector graphics shapes are selected or the user may explicitly define a dominant shape for a given operation via a GUI element, shape definitions, etc.

As illustrated in FIG. 14, the method 1400 further includes an act 1406, by a shape rendering manager of the vector shape manipulation system, of applying stroke and fill properties associated with the dominant shape to each of the plurality of vector graphics shapes. As discussed, the stroke and fill properties comprise the appearance of a shape and can include stroke color, stroke width, fill color, etc. In some embodiments, the appearance can be applied after the combination operation has been performed on the input shapes.

As illustrated in FIG. 14, the method 1400 further includes an act 1408 by the shape rendering manager of the vector shape manipulation system, of initializing a buffer at least as large as a bounding box associated with the plurality of vector graphics shapes, the buffer storing pixels inside the bounding box. As discussed, depending on implementation the buffer may be a texture which is operated on by a GPU or other accelerator. Additionally, the buffer or texture can be zero-initialized such that As illustrated in FIG. 14, the method 1400 further includes an act 1410 by the shape rendering manager of the vector shape manipulation system, of populating each pixel of the buffer with values representing pixel types determined from the plurality of vector graphics shapes based on the operation type. For example, the operation type may be a unite operation and the shape rendering manager may populate the buffer by writing a first sentinel fill value to pixels of the buffer that correspond to fill pixels for a first shape of the plurality of vector graphics shapes, incrementing the first sentinel fill value to create a second sentinel fill value, writing the second sentinel fill value to pixels of the buffer that correspond to fill pixels for a second shape of the plurality of vector graphics shapes, and writing a sentinel stroke value to pixels of the buffer that correspond to stroke pixels of the plurality of shapes, wherein the stroke pixels of the first shape overwrite fill pixels of the first shape and wherein the stroke pixels of the second shape overwrite fill pixels of the second shape.

In some embodiments, the operation type is an intersect operation and the method may further include initializing, by the shape rendering manager, a presence buffer of a same size as the buffer and writing, by the shape rendering manager, a presence value to pixels of the presence buffer that correspond to fill or stroke pixels of the plurality of vector graphics shapes, wherein the presence value is based on an existing value in the pixel of the presence buffer and represents a number of times a pixel is overlapped by a different shape from the plurality of vector graphics shapes. The shape rendering manager may then populate the buffer based on the presence buffer by writing sentinel stroke values and sentinel fill values to the buffer at locations corresponding to pixels of the presence buffer whose presence value is equal to a number of the plurality of vector graphics shapes being processed.

In some embodiments, the operation type is a minus front operation and the shape rendering manager can populate the buffer by writing a sentinel fill value to pixels of the buffer that correspond to fill pixels for a bottom-most shape of the plurality of vector graphics shapes, writing a sentinel stroke value to pixels of the buffer that correspond to stroke pixels for the bottom-most shape, setting values for a first plurality of pixels of the buffer that have had the sentinel stroke value or the sentinel fill value written to them upon determining that the first plurality of pixels correspond to fill pixels or stroke pixels for other shapes from the plurality of vector graphics shapes, and writing sentinel stroke values for a second plurality of pixels of the buffer that have had the sentinel stroke value or the sentinel fill value written to them upon determining that the second plurality of pixels correspond to fill pixels or stroke pixels for the other shapes.

In some embodiments, the operation type is a minus back operation and the shape rendering manager can populate the buffer by writing a sentinel fill value to pixels of the buffer that correspond to fill pixels for a top-most shape of the plurality of vector graphics shapes, writing a sentinel stroke value to pixels of the buffer that correspond to stroke pixels for the top-most shape, setting values for a first plurality of pixels of the buffer that have had the sentinel stroke value or the sentinel fill value written to them upon determining that the first plurality of pixels correspond to fill pixels or stroke pixels for other shapes from the plurality of vector graphics shapes, and writing sentinel stroke values for a second plurality of pixels of the buffer that have had the sentinel stroke value or the sentinel fill value written to them upon determining that the second plurality of pixels correspond to fill pixels or stroke pixels for the other shapes.

In some embodiments, the operation type is an exclude overlap operation and the shape rendering manager can populate the buffer by writing a first sentinel fill value to pixels of the buffer that correspond to fill pixels for a first shape of the plurality of vector graphics shapes, writing the first sentinel fill value to pixels of the buffer that correspond to fill pixels for a second shape of the plurality of vector graphics shapes and whose values do not equal the first sentinel fill value, writing a second sentinel fill value to pixels of the buffer that correspond to fill pixels for a second shape of the plurality of vector graphics shapes and whose values equal the first sentinel fill value, and writing a sentinel stroke value to pixels of the buffer that correspond to stroke pixels of the plurality of shapes, wherein the stroke pixels of the first shape overwrite fill pixels of the plurality of vector graphics shapes.

Figure 15:
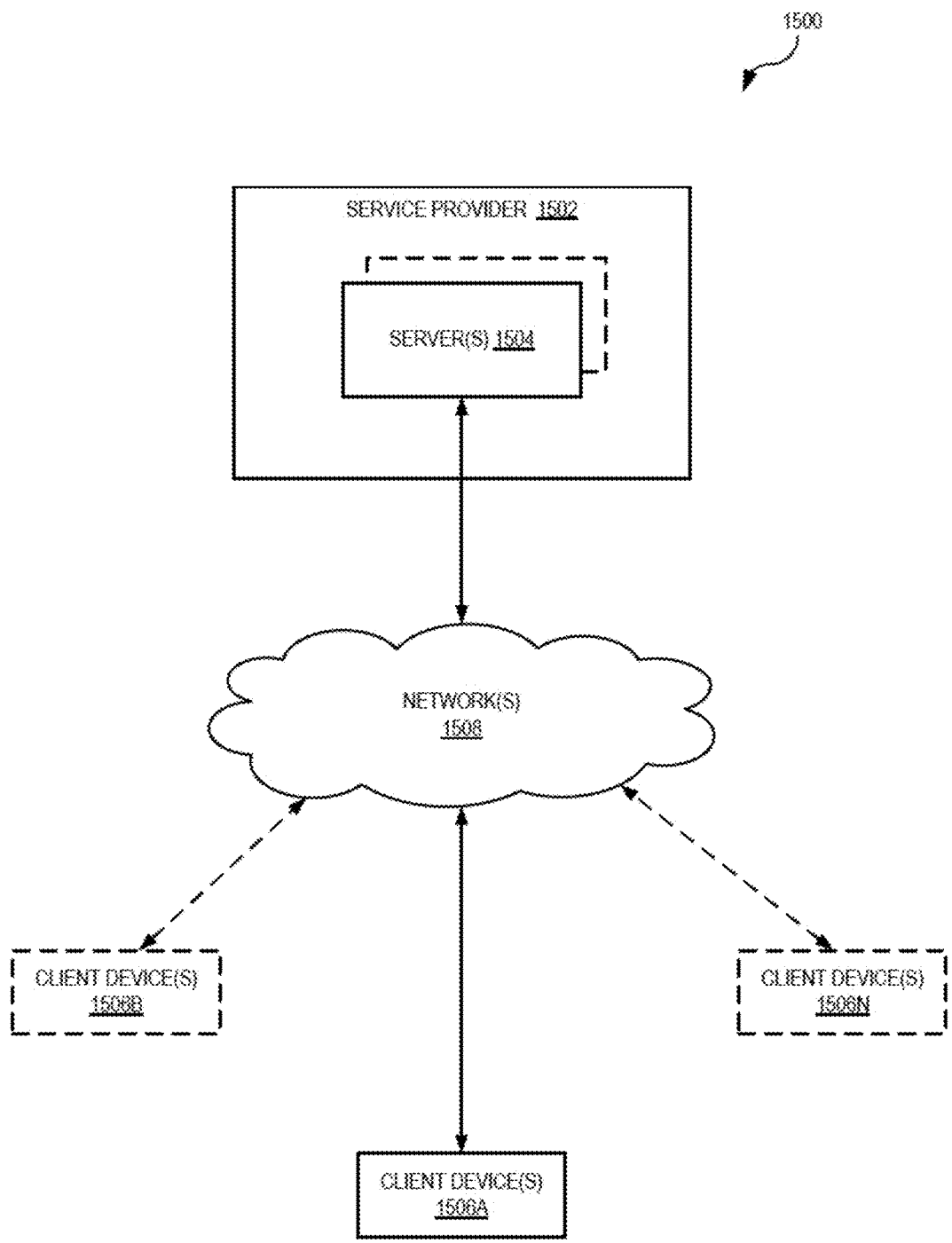
FIG. 15 illustrates a schematic diagram of an exemplary environment in which the image processing system can operate in accordance with one or more embodiments.

FIG. 15 illustrates a schematic diagram of an exemplary environment 1500 in which the vector shape manipulation system 102 can operate in accordance with one or more embodiments. In one or more embodiments, the environment 1500 includes a service provider 1502 which may include one or more servers 1504 connected to a plurality of client devices 1506A-1506N via one or more networks 1508. The client devices 1506A-1506N, the one or more networks 1508, the service provider 1502, and the one or more servers 1504 may communicate with each other or other components using any communication platforms and technologies suitable for transporting data and/or communication signals, including any known communication technologies, devices, media, and protocols supportive of remote data communications, examples of which will be described in more detail below with respect to FIG. 16.

Although FIG. 15 illustrates a particular arrangement of the client devices 1506A-1506N, the one or more networks 1508, the service provider 1502, and the one or more servers 1504, various additional arrangements are possible. For example, the client devices 1506A-1506N may directly communicate with the one or more servers 1504, bypassing the network 1508. Or alternatively, the client devices 1506A-1506N may directly communicate with each other. The service provider 1502 may be a public cloud service provider which owns and operates their own infrastructure in one or more data centers and provides this infrastructure to customers and end users on demand to host applications on the one or more servers 1504. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1504. In some embodiments, the service provider may be a private cloud provider which maintains cloud infrastructure for a single organization. The one or more servers 1504 may similarly include one or more hardware servers, each with its own computing resources, which are divided among applications hosted by the one or more servers for use by members of the organization or their customers.

Similarly, although the environment 1500 of FIG. 15 is depicted as having various components, the environment 1500 may have additional or alternative components. For example, the environment 1500 can be implemented on a single computing device with the vector shape manipulation system 102. In particular, the vector shape manipulation system 102 may be implemented in whole or in part on the client device 1502A.

As illustrated in FIG. 15, the environment 1500 may include client devices 1506A-1506N. The client devices 1506A-1506N may comprise any computing device. For example, client devices 1506A-1506N may comprise one or more personal computers, laptop computers, mobile devices, mobile phones, tablets, special purpose computers, TVs, or other computing devices, including computing devices described below with regard to FIG. 16. Although three client devices are shown in FIG. 15, it will be appreciated that client devices 1506A-1506N may comprise any number of client devices (greater or smaller than shown).

Moreover, as illustrated in FIG. 15, the client devices 1506A-1506N and the one or more servers 1504 may communicate via one or more networks 1508. The one or more networks 1508 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1508 may be any suitable network over which the client devices 1506A-1506N may access service provider 1502 and server 1504, or vice versa. The one or more networks 1508 will be discussed in more detail below with regard to FIG. 16.

In addition, the environment 1500 may also include one or more servers 1504. The one or more servers 1504 may generate, store, receive, and transmit any type of data, including shape buffer data, presence buffer data, or other information. For example, a server 1504 may receive data from a client device, such as the client device 1506A, and send the data to another client device, such as the client device 1502B and/or 1502N. The server 1504 can also transmit electronic messages between one or more users of the environment 1500. In one example embodiment, the server 1504 is a data server. The server 1504 can also comprise a communication server or a web-hosting server. Additional details regarding the server 1504 will be discussed below with respect to FIG. 16.

As mentioned, in one or more embodiments, the one or more servers 1504 can include or implement at least a portion of the vector shape manipulation system 102. In particular, the vector shape manipulation system 102 can comprise an application running on the one or more servers 1504 or a portion of the vector shape manipulation system 102 can be downloaded from the one or more servers 1504. For example, the vector shape manipulation system 102 can include a web hosting application that allows the client devices 1506A-1506N to interact with content hosted at the one or more servers 1504. To illustrate, in one or more embodiments of the environment 1500, one or more client devices 1506A-1506N can access a webpage supported by the one or more servers 1504. In particular, the client device 1506A can run a web application (e.g., a web browser) to allow a user to access, view, and/or interact with a webpage or website hosted at the one or more servers 1504.

As just described, the vector shape manipulation system 102 may be implemented in whole, or in part, by the individual elements 1502-1508 of the environment 1500. It will be appreciated that although certain components of the vector shape manipulation system 102 are described in the previous examples with regard to particular elements of the environment 1500, various alternative implementations are possible. For instance, in one or more embodiments, the vector shape manipulation system 102 is implemented on any of the client devices 1506A-N. Similarly, in one or more embodiments, the vector shape manipulation system 102 may be implemented on the one or more servers 1504. Moreover, different components and functions of the vector shape manipulation system 102 may be implemented separately among client devices 1506A-1506N, the one or more servers 1504, and the network 1508.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
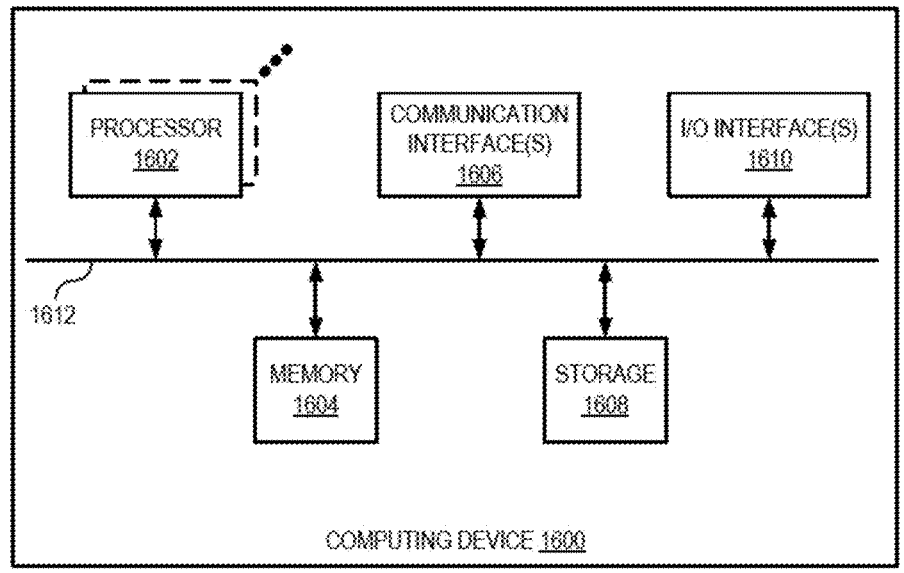
FIG. 16 illustrates a block diagram of an exemplary computing device in accordance with one or more embodiments.

FIG. 16 illustrates, in block diagram form, an exemplary computing device 1600 that may be configured to perform one or more of the processes described above. One will appreciate that one or more computing devices such as the computing device 1600 may implement the image processing system. As shown by FIG. 16, the computing device can comprise a processor 1602, memory 1604, one or more communication interfaces 1606, a storage device 1608, and one or more I/O devices/interfaces 1610. In certain embodiments, the computing device 1600 can include fewer or more components than those shown in FIG. 16. Components of computing device 1600 shown in FIG. 16 will now be described in additional detail.

In particular embodiments, processor(s) 1602 includes hardware for executing instructions, such as those making up a computer program. As an example, and not by way of limitation, to execute instructions, processor(s) 1602 may retrieve (or fetch) the instructions from an internal register, an internal cache, memory 1604, or a storage device 1608 and decode and execute them. In various embodiments, the processor(s) 1602 may include one or more central processing units (CPUs), graphics processing units (GPUs), field programmable gate arrays (FPGAs), systems on chip (SoC), or other processor(s) or combinations of processors.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1604 may be internal or distributed memory.

The computing device 1600 can further include one or more communication interfaces 1606. A communication interface 1606 can include hardware, software, or both. The communication interface 1606 can provide one or more interfaces for communication (such as, for example, packet-based communication) between the computing device and one or more other computing devices 1600 or one or more networks. As an example and not by way of limitation, communication interface 1606 may include a network interface controller (NIC) or network adapter for communicating with an Ethernet or other wire-based network or a wireless NIC (WNIC) or wireless adapter for communicating with a wireless network, such as a WI-FI. The computing device 1600 can further include a bus 1612. The bus 1612 can comprise hardware, software, or both that couples components of computing device 1600 to each other.

The computing device 1600 includes a storage device 1608 includes storage for storing data or instructions. As an example, and not by way of limitation, storage device 1608 can comprise a non-transitory storage medium described above. The storage device 1608 may include a hard disk drive (HDD), flash memory, a Universal Serial Bus (USB) drive or a combination these or other storage devices. The computing device 1600 also includes one or more input or output ("I/O") devices/interfaces 1610, which are provided to allow a user to provide input to (such as user strokes), receive output from, and otherwise transfer data to and from the computing device 1600. These I/O devices/interfaces 1610 may include a mouse, keypad or a keyboard, a touch screen, camera, optical scanner, network interface, modem, other known I/O devices or a combination of such I/O devices/interfaces 1610. The touch screen may be activated with a stylus or a finger.

The I/O devices/interfaces 1610 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1610 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
    receiving a selection of an operation type and a selection of a plurality of vector graphics shapes to be combined into a single vector graphic shape based on the operation type, the operation type including one of a unite operation, an intersect operation, a minus front operation, a minus back operation, and an exclude overlap operation;
    identifying a dominant shape based on the operation type;
    applying stroke and fill properties associated with the dominant shape to each of the plurality of vector graphics shapes;
    initializing a buffer at least as large as a bounding box associated with the plurality of vector graphics shapes, the buffer storing pixels inside the bounding box; and
    populating each pixel of the buffer with values representing pixel types determined from the plurality of vector graphics shapes based on the operation type.

2. The computer-implemented method of claim 1, wherein the operation type is the unite operation and wherein populating each pixel of the buffer with values representing pixel types determined from the plurality of vector graphics shapes based on the operation type, further comprises:
    writing a first sentinel fill value to pixels of the buffer that correspond to fill pixels for a first shape of the plurality of vector graphics shapes;
    incrementing the first sentinel fill value to create a second sentinel fill value;
    writing the second sentinel fill value to pixels of the buffer that correspond to fill pixels for a second shape of the plurality of vector graphics shapes; and
    writing a sentinel stroke value to pixels of the buffer that correspond to stroke pixels of the plurality of shapes, wherein the stroke pixels of the first shape overwrite fill pixels of the first shape and wherein the stroke pixels of the second shape overwrite fill pixels of the second shape.

3. The computer-implemented method of claim 1, wherein the operation type is the intersect operation and further comprising:
    initializing a presence buffer of a same size as the buffer;
    writing a presence value to pixels of the presence buffer that correspond to fill or stroke pixels of the plurality of vector graphics shapes, wherein the presence value is based on an existing value in the pixel of the presence buffer and represents a number of times a pixel is overlapped by a different shape from the plurality of vector graphics shapes; and wherein populating each pixel of the buffer with values representing pixel types determined from the plurality of vector graphics shapes based on the operation type, further comprises:

writing sentinel stroke values and sentinel fill values to the buffer at locations corresponding to pixels of the presence buffer whose presence value is equal to a number of the plurality of vector graphics shapes being processed.

4. The computer-implemented method of claim 1, wherein the operation type is the minus front operation and wherein populating each pixel of the buffer with values representing pixel types determined from the plurality of vector graphics shapes based on the operation type, further comprises:

writing a sentinel fill value to pixels of the buffer that correspond to fill pixels for a bottom-most shape of the plurality of vector graphics shapes;

writing a sentinel stroke value to pixels of the buffer that correspond to stroke pixels for the bottom-most shape;

setting values for a first plurality of pixels of the buffer that have had the sentinel stroke value or the sentinel fill value written to them upon determining that the first plurality of pixels correspond to fill pixels or stroke pixels for other shapes from the plurality of vector graphics shapes; and writing sentinel stroke values for a second plurality of pixels of the buffer that have had the sentinel stroke value or the sentinel fill value written to them upon determining that the second plurality of pixels correspond to fill pixels or stroke pixels for the other shapes.

5. The computer-implemented method of claim 1, wherein the operation type is the minus back operation and wherein populating each pixel of the buffer with values representing pixel types determined from the plurality of vector graphics shapes based on the operation type, further comprises:

writing a sentinel fill value to pixels of the buffer that correspond to fill pixels for a top-most shape of the plurality of vector graphics shapes;

writing a sentinel stroke value to pixels of the buffer that correspond to stroke pixels for the top-most shape;

setting values for a first plurality of pixels of the buffer that have had the sentinel stroke value or the sentinel fill value written to them upon determining that the first plurality of pixels correspond to fill pixels or stroke pixels for other shapes from the plurality of vector graphics shapes; and writing sentinel stroke values for a second plurality of pixels of the buffer that have had the sentinel stroke value or the sentinel fill value written to them upon determining that the second plurality of pixels correspond to fill pixels or stroke pixels for the other shapes.

6. The computer-implemented method of claim 1, wherein the operation type is the exclude overlap operation and wherein populating each pixel of the buffer with values representing pixel types determined from the plurality of vector graphics shapes based on the operation type, further comprises:

writing a first sentinel fill value to pixels of the buffer that correspond to fill pixels for a first shape of the plurality of vector graphics shapes;

writing the first sentinel fill value to pixels of the buffer that correspond to fill pixels for a second shape of the plurality of vector graphics shapes and whose values do not equal the first sentinel fill value;

writing a second sentinel fill value to pixels of the buffer that correspond to fill pixels for a second shape of the plurality of vector graphics shapes and whose values equal the first sentinel fill value; and writing a sentinel stroke value to pixels of the buffer that correspond to stroke pixels of the plurality of shapes, wherein the stroke pixels of the first shape overwrite fill pixels of the plurality of vector graphics shapes.

7. The computer-implemented method of claim 1, wherein identifying a dominant shape based on the operation type, further comprises:

receiving a selection of the dominant shape from the plurality of vector graphics shapes.

8. The computer-implemented method of claim 1, wherein the pixel types include a stroke pixel, a fill pixel, or a pixel that is not covered by the single vector graphic shape.

9. A non-transitory computer readable storage medium including instructions stored thereon which, when executed by a processor, cause the processor to:

receive a selection of an operation type and a selection of a plurality of vector graphics shapes to be combined into a single vector graphic shape based on the operation type, the operation type including one of a unite operation, an intersect operation, a minus front operation, a minus back operation, and an exclude overlap operation;

identify a dominant shape based on the operation type;

apply stroke and fill properties associated with the dominant shape to each of the plurality of vector graphics shapes;

initialize a buffer at least as large as a bounding box associated with the plurality of vector graphics shapes, the buffer storing pixels inside the bounding box; and populate each pixel of the buffer with values representing pixel types determined from the plurality of vector graphics shapes based on the operation type.

10. The non-transitory computer readable storage medium of claim 9, wherein the operation type is the unite operation and wherein the instructions to populate each pixel of the buffer with values representing pixel types determined from the plurality of vector graphics shapes based on the operation type, when executed, further cause the processor to:

write a first sentinel fill value to pixels of the buffer that correspond to fill pixels for a first shape of the plurality of vector graphics shapes;

increment the first sentinel fill value to create a second sentinel fill value;

write the second sentinel fill value to pixels of the buffer that correspond to fill pixels for a second shape of the plurality of vector graphics shapes; and write a sentinel stroke value to pixels of the buffer that correspond to stroke pixels of the plurality of shapes, wherein the stroke pixels of the first shape overwrite fill pixels of the first shape and wherein the stroke pixels of the second shape overwrite fill pixels of the second shape.

11. The non-transitory computer readable storage medium of claim 9, wherein the operation type is the intersect operation and wherein the instructions, when executed, further cause the processor to:

initialize a presence buffer of a same size as the buffer;

write a presence value to pixels of the presence buffer that correspond to fill or stroke pixels of the plurality of vector graphics shapes, wherein the presence value is based on an existing value in the pixel of the presence buffer and represents a number of times a pixel is overlapped by a different shape from the plurality of vector graphics shapes; and wherein the instructions to populate each pixel of the buffer with values representing pixel types determined from the plurality of vector graphics shapes based on the operation type, when executed, further cause the processor to:

write sentinel stroke values and sentinel fill values to the buffer at locations corresponding to pixels of the presence buffer whose presence value is equal to a number of the plurality of vector graphics shapes being processed.

12. The non-transitory computer readable storage medium of claim 9, wherein the operation type is the minus front operation and wherein the instructions to populate each pixel of the buffer with values representing pixel types determined from the plurality of vector graphics shapes based on the operation type, when executed, further cause the processor to:

write a sentinel fill value to pixels of the buffer that correspond to fill pixels for a bottom-most shape of the plurality of vector graphics shapes;

write a sentinel stroke value to pixels of the buffer that correspond to stroke pixels for the bottom-most shape;

set values for a first plurality of pixels of the buffer that have had the sentinel stroke value or the sentinel fill value written to them upon determining that the first plurality of pixels correspond to fill pixels or stroke pixels for other shapes from the plurality of vector graphics shapes; and write sentinel stroke values for a second plurality of pixels of the buffer that have had the sentinel stroke value or the sentinel fill value written to them upon determining that the second plurality of pixels correspond to fill pixels or stroke pixels for the other shapes.

13. The non-transitory computer readable storage medium of claim 9, wherein the operation type is the minus back operation and wherein the instructions to populate each pixel of the buffer with values representing pixel types determined from the plurality of vector graphics shapes based on the operation type, when executed, further cause the processor to:

write a sentinel fill value to pixels of the buffer that correspond to fill pixels for a top-most shape of the plurality of vector graphics shapes;

write a sentinel stroke value to pixels of the buffer that correspond to stroke pixels for the top-most shape;

set values for a first plurality of pixels of the buffer that have had the sentinel stroke value or the sentinel fill value written to them upon determining that the first plurality of pixels correspond to fill pixels or stroke pixels for other shapes from the plurality of vector graphics shapes; and write sentinel stroke values for a second plurality of pixels of the buffer that have had the sentinel stroke value or the sentinel fill value written to them upon determining that the second plurality of pixels correspond to fill pixels or stroke pixels for the other shapes.

14. The non-transitory computer readable storage medium of claim 9, wherein the operation type is the exclude overlap operation and wherein the instructions to populate each pixel of the buffer with values representing pixel types determined from the plurality of vector graphics shapes based on the operation type, when executed, further cause the processor to:

write a first sentinel fill value to pixels of the buffer that correspond to fill pixels for a first shape of the plurality of vector graphics shapes;

write the first sentinel fill value to pixels of the buffer that correspond to fill pixels for a second shape of the plurality of vector graphics shapes and whose values do not equal the first sentinel fill value;

write a second sentinel fill value to pixels of the buffer that correspond to fill pixels for a second shape of the plurality of vector graphics shapes and whose values equal the first sentinel fill value; and write a sentinel stroke value to pixels of the buffer that correspond to stroke pixels of the plurality of shapes, wherein the stroke pixels of the first shape overwrite fill pixels of the plurality of vector graphics shapes.

15. The non-transitory computer readable storage medium of claim 9, wherein the instructions to identify a dominant shape based on the operation type, when executed, further causes the processor to:

receive a selection of the dominant shape from the plurality of vector graphics shapes.

16. A system comprising:

a computing device including a memory, and at least one processor, the computing device implementing a vector shape manipulation system, wherein the memory includes instructions stored thereon which, when executed, cause the vector shape manipulation system to:

receive a selection of an operation type and a selection of a plurality of vector graphics shapes to be combined into a single vector graphic shape based on the operation type, the operation type including one of a unite operation, an intersect operation, a minus front operation, a minus back operation, and an exclude overlap operation;

identify a dominant shape based on the operation type;

apply stroke and fill properties associated with the dominant shape to each of the plurality of vector graphics shapes;

initialize a buffer at least as large as a bounding box associated with the plurality of vector graphics shapes, the buffer storing pixels inside the bounding box; and populate each pixel of the buffer with values representing pixel types determined from the plurality of vector graphics shapes based on the operation type.

17. The system of claim 16, wherein the operation type is the unite operation and wherein the instructions to populate each pixel of the buffer with values representing pixel types determined from the plurality of vector graphics shapes based on the operation type, when executed, further cause the vector shape manipulation system to:

write a first sentinel fill value to pixels of the buffer that correspond to fill pixels for a first shape of the plurality of vector graphics shapes;

increment the first sentinel fill value to create a second sentinel fill value;

write the second sentinel fill value to pixels of the buffer that correspond to fill pixels for a second shape of the plurality of vector graphics shapes; and write a sentinel stroke value to pixels of the buffer that correspond to stroke pixels of the plurality of shapes, wherein the stroke pixels of the first shape overwrite fill pixels of the first shape and wherein the stroke pixels of the second shape overwrite fill pixels of the second shape.

18. The system of claim 16, wherein the operation type is the intersect operation and wherein the instructions, when executed, further cause the vector shape manipulation system to:
  initialize a presence buffer of a same size as the buffer;
  write a presence value to pixels of the presence buffer that correspond to fill or stroke pixels of the plurality of vector graphics shapes, wherein the presence value is based on an existing value in the pixel of the presence buffer and represents a number of times a pixel is overlapped by a different shape from the plurality of vector graphics shapes; and
  wherein the instructions to populate each pixel of the buffer with values representing pixel types determined from the plurality of vector graphics shapes based on the operation type, when executed, further cause the processor to:
    write sentinel stroke values and sentinel fill values to the buffer at locations corresponding to pixels of the presence buffer whose presence value is equal to a number of the plurality of vector graphics shapes being processed.

19. The system of claim 16, wherein the operation type is the minus front operation and wherein the instructions to populate each pixel of the buffer with values representing pixel types determined from the plurality of vector graphics shapes based on the operation type, when executed, further cause the vector shape manipulation system to:
  write a sentinel fill value to pixels of the buffer that correspond to fill pixels for a bottom-most shape of the plurality of vector graphics shapes;
  write a sentinel stroke value to pixels of the buffer that correspond to stroke pixels for the bottom-most shape;
  set values for a first plurality of pixels of the buffer that have had the sentinel stroke value or the sentinel fill value written to them upon determining that the first plurality of pixels correspond to fill pixels or stroke pixels for other shapes from the plurality of vector graphics shapes; and
  write sentinel stroke values for a second plurality of pixels of the buffer that have had the sentinel stroke value or the sentinel fill value written to them upon determining that the second plurality of pixels correspond to fill pixels or stroke pixels for the other shapes.

20. The system of claim 16, wherein the operation type is the minus back operation and wherein the instructions to populate each pixel of the buffer with values representing pixel types determined from the plurality of vector graphics shapes based on the operation type, when executed, further cause the vector shape manipulation system to:
  write a sentinel fill value to pixels of the buffer that correspond to fill pixels for a top-most shape of the plurality of vector graphics shapes;
  write a sentinel stroke value to pixels of the buffer that correspond to stroke pixels for the top-most shape;
  set values for a first plurality of pixels of the buffer that have had the sentinel stroke value or the sentinel fill value written to them upon determining that the first plurality of pixels correspond to fill pixels or stroke pixels for other shapes from the plurality of vector graphics shapes; and
  write sentinel stroke values for a second plurality of pixels of the buffer that have had the sentinel stroke value or the sentinel fill value written to them upon determining that the second plurality of pixels correspond to fill pixels or stroke pixels for the other shapes.

21. The system of claim 16, wherein the operation type is the exclude overlap operation and wherein the instructions to populate each pixel of the buffer with values representing pixel types determined from the plurality of vector graphics shapes based on the operation type, when executed, further cause the vector shape manipulation system to:
  write a first sentinel fill value to pixels of the buffer that correspond to fill pixels for a first shape of the plurality of vector graphics shapes;
  write the first sentinel fill value to pixels of the buffer that correspond to fill pixels for a second shape of the plurality of vector graphics shapes and whose values do not equal the first sentinel fill value;
  write a second sentinel fill value to pixels of the buffer that correspond to fill pixels for a second shape of the plurality of vector graphics shapes and whose values equal the first sentinel fill value; and
  write a sentinel stroke value to pixels of the buffer that correspond to stroke pixels of the plurality of shapes, wherein the stroke pixels of the first shape overwrite fill pixels of the plurality of vector graphics shapes.

* * * * *